United States Patent
Cochran et al.

(10) Patent No.: US 11,773,265 B2
(45) Date of Patent: Oct. 3, 2023

(54) BIOSOLVENTS USEFUL FOR IMPROVED ASPHALT PRODUCTS UTILIZING RECYCLED ASPHALT PAVEMENT OR OTHER BRITTLE ASPHALT BINDERS SUCH AS VACUUM TOWER BOTTOM

(71) Applicant: Iowa State University Research Foundation, Inc., Ames, IA (US)

(72) Inventors: Eric W. Cochran, Ames, IA (US); Nacu Hernandez, Ames, IA (US); Austin Hohmann, Ames, IA (US); Ronald Christopher Williams, Ames, IA (US); Michael Forrester, Ames, IA (US); Joseph H. Podolsky, Ames, IA (US); Paul Ledtje, Ames, IA (US); Conglin Chen, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 204 days.

(21) Appl. No.: 17/025,625

(22) Filed: Sep. 18, 2020

(65) Prior Publication Data

US 2021/0079224 A1    Mar. 18, 2021

Related U.S. Application Data

(60) Provisional application No. 62/989,419, filed on Mar. 13, 2020, provisional application No. 62/901,911, filed on Sep. 18, 2019.

(51) Int. Cl.
C08L 95/00 (2006.01)
C04B 26/26 (2006.01)
(Continued)

(52) U.S. Cl.
CPC ............ C08L 95/00 (2013.01); C04B 26/26 (2013.01); C08K 5/101 (2013.01); C08K 5/11 (2013.01);
(Continued)

(58) Field of Classification Search
None
See application file for complete search history.

(56) References Cited

U.S. PATENT DOCUMENTS 2,782,216 A    2/1957   Hayes et al.
3,070,608 A    12/1962  Kuester et al.
(Continued)

FOREIGN PATENT DOCUMENTS

CN    101041574 A    9/2007
CN    101694083 A    4/2010
(Continued)

OTHER PUBLICATIONS

Yu et al. "Diffusibility Enhancement of Rejuvenator by Epoxidized Soybean Oil and Its Influence on the Performance of Recycled Hot Mix Asphalt Mixtures" Materials 2018, 11, 833, doi: 10.3390/ma11050833. May 18, 2018 (Year: 2018).*
(Continued)

*Primary Examiner* — Alexandra M Moore
(74) *Attorney, Agent, or Firm* — Troutman Pepper Hamilton Sanders LLP

(57) ABSTRACT

The present application is directed to an asphalt binder composition comprising:
an asphalt binder;
a compound of formula (I):

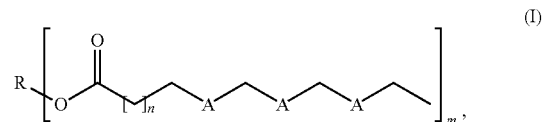

wherein R, A, n, and m are as described herein,
(Continued)

a compound of formula (II):

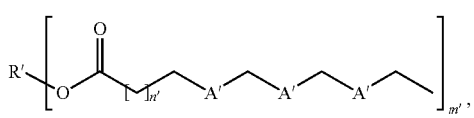

wherein R', A', n', and m' are as described herein. The present application is also directed to further compositions, methods of producing an asphalt binder composition, and methods of paving.

33 Claims, 9 Drawing Sheets

(51) Int. Cl.
    *C08K 5/101*     (2006.01)
    *C08K 5/11*     (2006.01)
    *C08K 5/1515*     (2006.01)
    *C04B 111/00*     (2006.01)

(52) U.S. Cl.
    CPC ... *C08K 5/1515* (2013.01); *C04B 2111/00586* (2013.01); *C08L 2310/00* (2013.01); *C08L 2555/22* (2013.01); *C08L 2555/34* (2013.01); *C08L 2555/84* (2013.01)

(56) References Cited

U.S. PATENT DOCUMENTS

| | | | |
|---|---|---|---|
| 3,755,226 A | 8/1973 | Christiansen et al. | |
| 4,597,799 A | 7/1986 | Schilling | |
| 4,806,166 A | 2/1989 | Schilling et al. | |
| 4,836,857 A | 6/1989 | Hopkins | |
| 4,966,490 A | 10/1990 | Hodson | |
| 5,023,282 A | 6/1991 | Neubert | |
| 5,221,703 A | 6/1993 | Ostermeyer | |
| 5,271,767 A | 12/1993 | Light, Sr. et al. | |
| 5,437,717 A | 8/1995 | Doyle et al. | |
| 5,473,000 A | 12/1995 | Pinomaa | |
| 6,495,074 B1 | 12/2002 | Carr | |
| 6,749,677 B2 | 6/2004 | Freisthler | |
| 6,764,542 B1 | 7/2004 | Lackey et al. | |
| 6,797,753 B2 | 9/2004 | Benecke et al. | |
| 7,074,266 B2 | 7/2006 | Hawkins et al. | |
| 7,420,008 B2 | 9/2008 | Bloom | |
| 7,662,225 B2 | 2/2010 | Antoine et al. | |
| 7,842,746 B2 | 11/2010 | Bloom et al. | |
| 7,951,238 B2 | 5/2011 | Deneuvillers et al. | |
| 7,951,766 B1 | 5/2011 | Frenkel et al. | |
| 7,951,862 B2 | 5/2011 | Bloom et al. | |
| 7,994,107 B2 | 8/2011 | Bloom | |
| 8,034,172 B2 | 10/2011 | Naidoo et al. | |
| 8,137,451 B2 | 3/2012 | Aerts et al. | |
| 8,198,223 B2 | 6/2012 | Bloom | |
| 8,198,224 B2 | 6/2012 | Bloom | |
| 8,257,483 B2 | 9/2012 | Aerts et al. | |
| 8,703,849 B2 | 8/2014 | Hagberg et al. | |
| 8,808,445 B2 | 8/2014 | Coe | |
| 8,814,464 B2 | 8/2014 | McDade et al. | |
| 8,821,064 B1 | 9/2014 | Morris et al. | |
| 8,926,742 B2 | 1/2015 | Coe | |
| 9,000,196 B2 | 4/2015 | Hagberg et al. | |
| 9,115,295 B2 | 8/2015 | Deneuvillers et al. | |
| 9,139,733 B2 | 9/2015 | McDade et al. | |
| 9,347,187 B2 | 5/2016 | Coe | |
| 9,416,274 B2 | 8/2016 | Frank | |
| 10,030,145 B2 | 7/2018 | Severance et al. | |
| 10,119,026 B2 | 11/2018 | Gonzalez Leon et al. | |
| 10,316,192 B2 | 6/2019 | Kurth et al. | |
| 10,336,927 B2 | 7/2019 | Bahr | |
| 10,570,286 B2 * | 2/2020 | Williams | E04D 1/20 |
| 10,604,655 B2 * | 3/2020 | Williams | C08K 5/1515 |
| 10,899,928 B2 | 1/2021 | McCurdy et al. | |
| 10,961,395 B2 | 3/2021 | Williams et al. | |
| 11,193,243 B2 | 12/2021 | Chesky | |
| 11,370,918 B2 | 6/2022 | Williams et al. | |
| 2002/0026884 A1 | 3/2002 | Raad | |
| 2004/0025745 A1 | 2/2004 | Freisthler | |
| 2005/0038147 A1 | 2/2005 | Andersen | |
| 2005/0148714 A1 * | 7/2005 | Neimann | C08L 91/005 524/313 |
| 2009/0137705 A1 | 5/2009 | Faucon Dumont et al. | |
| 2010/0034586 A1 | 2/2010 | Bailey et al. | |
| 2010/0040832 A1 | 2/2010 | Herbert | |
| 2010/0275817 A1 | 11/2010 | Williams et al. | |
| 2010/0292492 A1 * | 11/2010 | Geng | B01J 31/0211 502/340 |
| 2012/0167802 A1 | 7/2012 | Huh | |
| 2013/0022823 A1 | 1/2013 | Franks, Sr. | |
| 2013/0160674 A1 | 6/2013 | Hong et al. | |
| 2013/0171899 A1 | 7/2013 | Kalkanoglu et al. | |
| 2013/0186302 A1 | 7/2013 | Naidoo et al. | |
| 2013/0239850 A1 | 9/2013 | Naidoo et al. | |
| 2013/0295394 A1 | 11/2013 | Hong et al. | |
| 2014/0000479 A1 | 1/2014 | Stevens et al. | |
| 2014/0033951 A1 | 2/2014 | Ech et al. | |
| 2014/0261076 A1 | 9/2014 | Quinn et al. | |
| 2015/0225358 A1 | 8/2015 | Howard et al. | |
| 2015/0337078 A1 | 11/2015 | Cochran et al. | |
| 2016/0289971 A1 | 10/2016 | Becker, IV | |
| 2016/0297969 A1 | 10/2016 | Naidoo et al. | |
| 2016/0376440 A1 | 12/2016 | Naidoo et al. | |
| 2017/0247542 A1 | 8/2017 | Williams et al. | |
| 2017/0283615 A1 | 10/2017 | Williams et al. | |
| 2018/0023259 A1 | 1/2018 | Kurth et al. | |
| 2018/0030193 A1 | 2/2018 | Bloom et al. | |
| 2018/0057686 A1 * | 3/2018 | Williams | E01C 7/18 |
| 2018/0148575 A1 | 5/2018 | Kurth et al. | |
| 2018/0171147 A1 | 6/2018 | Allen et al. | |
| 2018/0209102 A1 | 7/2018 | Baumgardner et al. | |
| 2018/0334603 A1 | 11/2018 | Bahr et al. | |
| 2018/0340068 A1 | 11/2018 | McCurdy et al. | |
| 2019/0048148 A1 | 2/2019 | Lalgudi | |
| 2019/0152850 A1 | 5/2019 | Warner et al. | |
| 2019/0242069 A1 | 8/2019 | Fennell et al. | |
| 2019/0300714 A1 | 10/2019 | Watson et al. | |
| 2020/0165459 A1 | 5/2020 | Williams et al. | |
| 2021/0130616 A1 | 5/2021 | Williams et al. | |
| 2022/0033305 A1 | 2/2022 | Cochran et al. | |
| 2022/0112130 A1 | 4/2022 | Williams et al. | |

FOREIGN PATENT DOCUMENTS

| | | |
|---|---|---|
| CN | 101696097 A | 4/2010 |
| CN | 102092988 A | 6/2011 |
| CN | 102443271 A | 5/2012 |
| CN | 102702760 A | 10/2012 |
| CN | 102786806 A | 11/2012 |
| CN | 102838317 A | 12/2012 |
| CN | 102838874 A | 12/2012 |
| CN | 102964858 A | 3/2013 |
| CN | 102977620 A | 3/2013 |
| CN | 103102703 A | 5/2013 |
| CN | 103497521 A | 1/2014 |
| CN | 103602087 A | 2/2014 |
| CN | 103709415 A | 4/2014 |
| CN | 103788665 A | 5/2014 |
| CN | 103788667 A | 5/2014 |
| CN | 103980147 A | 8/2014 |
| CN | 104250520 A | 12/2014 |
| DE | 19519539 A1 | 12/1995 |
| DE | 195 01 212 A1 | 6/1996 |
| DE | 196 01495 A1 | 7/1997 |
| EP | 0568757 A1 | 11/1993 |
| EP | 0999237 A1 | 5/2000 |
| EP | 1524300 A1 | 4/2005 |
| EP | 1696002 A1 | 8/2006 |
| EP | 1717275 A1 | 11/2006 |
| EP | 2083050 A1 | 7/2009 |
| EP | 2245090 A1 | 11/2010 |

(56) References Cited

FOREIGN PATENT DOCUMENTS

| | | | | |
|---|---|---|---|---|
| FR | 2963354 A1 | 7/2010 | | |
| GB | 584344 | 1/1947 | | |
| GB | 610629 | 10/1948 | | |
| JP | 3158251 B2 | 7/2000 | | |
| JP | 2012046641 A | 3/2012 | | |
| JP | 5341892 B2 | 11/2012 | | |
| KR | 101166155 B1 | 7/2012 | | |
| KR | 101487180 B1 | 1/2015 | | |
| RU | 2461594 C1 | 9/2012 | | |
| WO | WO-9109907 A * | 7/1991 | ............ | A61K 39/08 |
| WO | 93/00406 A1 | 1/1993 | | |
| WO | 97/35940 A1 | 10/1997 | | |
| WO | 00/20538 A1 | 4/2000 | | |
| WO | 2003093404 A1 | 11/2003 | | |
| WO | 2006/107179 A2 | 10/2006 | | |
| WO | 2007/062158 A2 | 5/2007 | | |
| WO | 2009/102877 A1 | 8/2009 | | |
| WO | 2016/033603 A1 | 3/2016 | | |
| WO | 2016/033605 A1 | 3/2016 | | |
| WO | WO-2016033605 A1 * | 3/2016 | ........... | C07D 493/00 |
| WO | 2020/061030 A1 | 3/2020 | | |
| WO | 2020077213 A1 | 4/2020 | | |
| WO | 2020086558 A1 | 4/2020 | | |

OTHER PUBLICATIONS

International Preliminary Report on Patentability for Application No. PCT/US2019/051490 (dated Mar. 25, 2021).
"Oxirane Oxygen in Epoxidized Materials," American Oil Chemists' Society (2017).
International Search Report and Written Opinion for corresponding Application No. PCT/US2020/051588 (dated Dec. 23, 2020).
International Preliminary Report on Patentability for corresponding Application No. PCT/US2015/047810 (dated Feb. 28, 2017).
U.S. Appl. No. 17/140,465 to Williams et al. filed Jan. 4, 2021, first named inventor Ronald Christopher Williams.
U.S. Appl. No. 17/275,500 to Cochran et al. filed Mar. 11, 2021, first named inventor Eric W. Cochran.
Biresaw, G., et al., "Elastohydrodynamic Properties of Biobased Heat-Bodied Oils," Ind. Eng. Chem. Res. 53:16183-16195 (2014).
Erhan, S. Z., et al., "Vegetable Oil-based Printing Inks," J. Am. Oil Chem. Soc. 69:251-256 (1992).
Erhan, S. Z., et al., "Lithographic and Letterpress Ink Vehicles from Vegetable Oils," J. Am. Oil Chem. Soc. 68:635-638 (1991).
Mitchell, J., et al., "Ultraviolet Absorption Spectra of Linseed Oil: Determination of Bodied-in-Vacuo and Blown Linseed Oil in Mixtures with Raw Linseed Oil," Ind. Eng. Chem. Anal. Ed. 13:765-768 (1941).
Black, M. M. et al., "South African Fish Products. XXXI.—The Composition of Pilchard Oil and of Maasbanker Oil," J. Sci. Food Agric 1:248-251 (1950).
Standard Test Method for Viscosity of Transparent Liquids by Bubble Time Method. (ASTM International) (2017).
Paschke, et al., "Inter- and Intramolecular Polymerization in Heat-Bodied Linseed Oil," J. Am Oil Chem Soc. 31:208-211 (1954).
Test Method for Viscosity of Transparent Liquids by Bubble Time Method. (ASTM International), 1545-13R17 (see Iodine value. Wikipedia (2020) available at: https://en.wikipedia.org/w/index.php?title=Iodine_value&oldid=960069598. (Accessed: Sep. 8, 2020).
Office Action for U.S. Appl. No. 16/751,520 (dated Sep. 16, 2021).
International Preliminary Report on Patentability for PCT/US2020/051588 (dated Mar. 15, 2022).
Office Action for U.S. Appl. No. 15/507,475 (dated Apr. 11, 2019).
Restriction Requirement in U.S. Appl. No. 15/507,475 (dated Nov. 5, 2018).
Office Action for U.S. Appl. No. 15/445,307 (dated Jan. 11, 2019).
Elkashef et al., "Improving Fatigue and Low Temperature Performance of 100% RAP Mixtures Using a Soybean-Derived Rejuvenator," Construction and Building Materials 151:345-352 (2017).
Elkashef et al., "Preliminary Examination of Soybean Oil Derived Material as a Potential Rejuvenator Through Superpave Criteria and Asphalt Bitumen Rheology," Construction and Building Materials 149:826-836 (2017).
Elkashef et al., "Instroducing a Soybean Oil-Derived Material as a Potential Rejuvenator of Asphalt Through Rheology, Mix Characterisation and Fourier Transform Infrared Analysis," Road Materials and Pavement Design 19(8):1750-1770 (2018).
Material Safety Data Sheet for Epoxidized Isoamyl Soyate, Revision Date: Feb. 5, 2010.
Material Safety Data Sheet for Glycerin Removal Column Bottoms, Revision Date: Feb. 29, 2012.
Material Safety Data Sheet for MONG, Revision Date: Oct. 11, 2012.
Material Safety Data Sheet for Mixed Short Chain Polyols, Revision Date: Mar. 25, 2011.
Material Safety Data Sheet for ADM CA118, Revision Date: Jun. 25, 2014.
Material Safety Data Sheet for Alinco Z-2 Z-3 Linseed Oil, Revision Date: Feb. 12, 2014.
Material Safety Data Sheet for OKO M-37 Linseed Oil, Issue Date: Jul. 10, 2002.
Material Safety Data Sheet for Toplin X-Z Linseed Oil, Issue Date: Aug. 18, 2005.
International Search Report and Written Opinion for Application No. PCT/US2015/047798 (dated Dec. 9, 2015).
Kim, Y.R., "Program Book of the 12th ISAP Conference on Asphalt Pavements," 12th ISAP Conference, Jul. 1, 2014, Raleigh, North Carolina.
Podolsky et al., "Investigation of Bio-Derived Materials Including Isosorbide-Based Materials as Bio-Based Warm Mix Asphalt Additives," Poster Presentation ISAP 2014 Conference, Jun. 5, 2014, p. 1, Raleigh, North Carolina.
Preliminary Agenda and Abstracts of the 51st Petersen Asphalt Research Conference, Wyoming Conference Center (Jul. 16, 2014).
International Search Report and Written Opinion for corresponding Application No. PCT/US2015/047810 (dated Dec. 3, 2015).
Podolsky et al., "Comparative Performance of Bio-Derived/Chemical Additives in Warm Mix Asphalt at Low Temperature," 51st Annual Petersen Asphalt Research Conference, Iowa State University (Jul. 16, 2014).
Office Action for U.S. Appl. No. 15/691,295 (dated Apr. 4, 2019).
Office Action for U.S. Appl. No. 15/445,307 (dated Jul. 25, 2019).
Sharma et al., "Oxidation, Friction Reducing, and Low Temperature Properties of Epoxy Fatty Acid Methyl Esters," Green Chemistry 9:469-474 (2007).
Perkins E.G "Chapter 2. Composition of Soybeans and Soybean Products," Practical Handbook of Soybean Processing and Utilization, AOCS Press, p. 9-28 (1995).
Sahoo et al., "Toughened Bio-Based Epoxy Blend Network Modified With Transesterified Epoxidized Soybean Oil: Synthesis and Characterization," RSC Adv. 5:13674-13691 (2015).
Office Action for U.S. Appl. No. 15/445,307 (dated Mar. 6, 2020).
International Search Report and Written Opinion for corresponding Application No. PCT/US2019/051490 (dated Jan. 14, 2020).
International Preliminary Report on Patentability for Application No. PCT/US2015/047798 (dated Mar. 9, 2017).
Office Action for U.S. Appl. No. 17/140,465 (dated Oct. 27, 2022).
Yang and You, "New Predictive Equations for Dynamic Modulus and Phase Angle Using a Nonlinear Least-Squares Regression Model," Journal of Materials in Civil Engineering 27(3):04014131-1 thru 04014131-8 (2015).
Yan et al., "Gel Point Suppression in RAFT Polymerization of Pure Acrylic Cross-Linker Derived from Soybean Oil," Biomacromolecules 17:2701-2709 (2016).
Wang et al., "Investigating the Interactions of the Saturate, Aromatic, Resin, and Asphaltene Four Fractions in Asphalt Binders by Molecular Simulations," Energy Fuels 29:112-121 (2015).
Wang et al., "Effects of SARA Fractions on Low Temperature Properties of Asphalt Binders," Road Materials and Pavement Design (2019).
Tadros, "Emulsion Formation, Stability, and Rheology," Wiley-VCH Verlag GmbH and Co. (2013).

(56) References Cited

OTHER PUBLICATIONS

"Roads," Infrastructure Report Card, pp. 76-80 (2017).

Podolsky et al., "Effect of Corn and Soybean Oil Derived Additives on Polymer-Modified HMA and WMA Master Curve Construction and Dynamic Modulus Performance," International Journal of Pavement Research and Technology 11:541-552 (2018).

Podolsky et al., "Effect of Bio-Derived/Chemical Additives on Warm Mix Asphalt Compaction and Mix Performance at Low Temperature," Cold Regions Science and Technology 136:52-61 (2017).

Pellinen and Witczak, "Stress Dependent Master Curve Construction for Dynamic (Complex) Modulus," School of Engineering, Purdue University pp. 281-309 (2002).

"Engineering Overview," National Asphalt Pavement Association (2020).

Li et al., "Mechanistic-based Comparisons for Freeze-thaw Performance of Stabilized Unpaved Roads," Cold Regions Science and Technology 141:97-108 (2017).

Elkashef et al., "Using Viscosity Models to Predict the Properties of Rejuvenated Reclaimed Asphalt Pavement (RAP) Binders," Road Materials and Pavement Design pp. 1-13 (2019).

Elkashef et al., "Investigation of Fatigue and Thermal Cracking Behavior of Rejuvenated Reclaimed Asphalt Pavement Binders and Mixtures," International Journal of Fatigue 108:90-95 (2018).

Booij and Thoone, "Generalization of Kramers—Kronig Transforms and Some Approximations of Relations Between Viscoelastic Quantities," Rheol. Acta 21:15-24 (1982).

Barnes, "Rheology of Emulsions—A Review," Colloids Surfaces A: Physicochem. Eng. Aspects 91:89-95 (1994).

"Alternatives to Seal Coats," Transportation Research Synthesis, Local Road Research Board, Minnesota Department of Transportation TRS 1602 pp. 1-44 (Feb. 2016).

International Search Report and Written Opinion for PCT/US2021/54549 (dated Feb. 14, 2022).

PubChem-CID-5280934 (Sep. 16, 2004).

Invitation to Pay Additional Fees for PCT/US2021/54549 (dated Dec. 15, 2021).

Wang et al. "Micro-Surfacing Mixtures with Reclaimed Asphalt Pavement: Mix Design and Performance Evaluation," Construction and Building Materials 201:303-313 (2019).

Sun et al. "Optimization of Synthesis Technology to Improve the Design of Asphalt Self-Healing Microcapsules," Construction and Building Materials 175:88-103 (2018).

Chiu et al., "Effectiveness of Seal Rejuvenators for Bituminous Pavement Surfaces," Journal of Testing and Evaluation 34(5):390-394 (2006).

Liu et al., "Effects of Emulsifier Dosage and Curing Time on Self-Healing Microcapsules Containing Rejuvenator and Optimal Dosage in Asphalt Binders," Journal of Nanoscience and Nanotechnology 19(1):57-65 (2019).

Muncy, Steven G. "Classification of Emulsified Recycling Agents," Asphalt Emulsions, ASTM International, p. 36-43 (1990).

Wang et al., "Diffusion Mechanism of Rejuvenator and its Effects on the Physical and Rheological Performance of Aged Asphalt Binder," Materials 12:4130 (2019).

Khosla, N. P. "Effect of Emulsified Modifiers on the Characteristics of Recycled Mixtures," Association of Asphalt Paving Technologists Proceedings 51:522-539 (1982).

Zeng et al., "Effects of Various Rejuvenator Sealer Materials on Rheological Properties of Aged SBS Modified Asphalt," Key Engineering Materials 599:155-158 (2014).

King et al., "Spray Applied Polymer Surface Seals," Final Report, Foundation for Pavement Preservation/Federal Highway Administration, Washington, DC (2007).

Pan et al., "A Comprehensive Evaluation of Rejuvenator on Mechanical Properties, Durability, and Dynamic Characteristics of Artificially Aged Asphalt Mixture," Materials 11(9):1554 (2018).

Jamal et al., "Influence of Cereclor on the Performance of Aged Asphalt Binder," International Journal of Pavement Engineering 1-12 (2018).

Ghosh et al., "Laboratory and Field Investigation of the Effects of Biosealant Applications to the Surface of Asphalt Pavement," Journal of Materials in Civil Engineering 30(8):04018187 (2018).

Ghosh et al., "Rheological Characterization of Asphalt Binders Treated with Bio Sealants for Pavement Preservation," Canadian Journal of Civil Engineering 45(5):407-412 (2018).

Pan et al., "Effect of Healing Agents on Crack Healing of Asphalt and Asphalt Mortar," Materials 11:1373 (2018).

Babashamsi et al., "Recycling Toward Sustainable Pavement Development: End-of-Life Considerations in Asphalt Pavement," Jurnal Teknologi 78(7-2):25-32 (2016).

Jordan, W. S., "Laboratory Evaluation of Surface Treatments to Asphaltic Pavements in Mississippi," Thesis, Mississippi State University (2010).

Marotta, A., "Renewable Furan-Derived Epoxy Thermosets and Nanocomposites for Coating Applications," Thesis (2019).

Fuhaid et al. "Laboratory Evaluation of Biobased Epoxy Asphalt Binder for Asphalt Pavement," Journal of Materials in Civil Engineering 30(7): 06018007 (2018).

Ji et al., "Effectiveness of Vegetable Oils as Rejuvenators for Aged Asphalt Binders," Journal of Materials in Civil Engineering 29(3):D4016003 (2016).

Tarar et al., "Compatibility of Sunflower Oil with Asphalt Binders: A Way Toward Materials Derived from Renewable Resources," Materials and Structures 53:64 (2020).

Al Fuhaid et al., "Biobased Epoxy Asphalt Binder (BEAB) for Pavement Asphalt Mixtures," Thesis, University of South Florida (2018).

Xin et al., "Development and Evaluation of Porous Pavement Surface Mixtures with Bio-Based Epoxy Asphalt Binder," Center for Transportation, Environment, and Community Health (2019).

Bailey et al., "The Use of Vegetable Oil in Asphalt Mixtures, in the Laboratory and Field," The 5th Eurasphalt & Eurobitume Congress (2012).

Brownridge, J. "Fog Seal, Scrub Seal, Rejuvenator: Benefits and Differences," (2016).

Ghosh et al., "Evaluation of Bio-Fog Sealants for Pavement Preservation," Minnesota Department of Transportation (2016).

International Preliminary Report on Patentability for PCT/US2021/054549 (dated Apr. 27, 2023).

Office Action for European Patent Application No. 20786155.0 (dated Apr. 24, 2023).

Office Action for U.S. Appl. No. 17/140,465 (dated Jun. 9, 2023).

* cited by examiner

Figures 7A-D

BIOSOLVENTS USEFUL FOR IMPROVED ASPHALT PRODUCTS UTILIZING RECYCLED ASPHALT PAVEMENT OR OTHER BRITTLE ASPHALT BINDERS SUCH AS VACUUM TOWER BOTTOM

This application claims the benefit of U.S. Provisional Patent Application Ser. No. 62/901,911, filed Sep. 18, 2019, and U.S. Provisional Patent Application Ser. No. 62/989,419, filed Mar. 13, 2020, which are hereby incorporated by reference in their entirety.

FIELD

The present application relates to biosolvents useful for improved asphalt products utilizing recycled asphalt pavement or other brittle asphalt binders such as vacuum tower bottoms.

BACKGROUND

The domestic asphalt paving market is estimated by the National Asphalt Pavement Association to be 350 million tons per year in 2019, comprising approximately 35 billion pounds of asphalt binder. Most of these pavements must satisfy the SuperPave Performance Grade Specifications outlined in AASHTO M320, and in addition many states have implemented or are considering imposing the more stringent elastic recovery specifications testable through the Multiple Stress Creep Recovery protocol. Binders naturally capable of meeting these requirements have faced an increasingly tight supply over the past several years due to several factors, including an outpacing of demand, a shift of the naphtha refining complex towards shale gas processing, and the continued improvements of heavy crude processors with respect to deasphalting technologies that produce higher value fuels but leave behind bottoms products overly enriched in asphaltenes and resinous materials. Such asphalts, including Vacuum Distillation Tower Bottoms (VTBs) and Low Quality Asphalts (LQAs) such as: Solvent DeAsphalted (SDA) bottoms, or ROSE bottoms, are stiff and brittle due to their exceedingly high asphaltene content. Accordingly, contractors and terminal suppliers are faced with significant challenges in formulating pavements that meet performance specifications by combining various sources of binders, aggregates, and additives. The comparatively high cost of premium paving grade asphalts, such as PG64-22 or PG58-28, can be offset by blending them with LQAs. Nonetheless, the stiffness and brittleness of the VTBs and LQA must be further addressed through the use of a fluxing agent, such as heavy heating oils, aromatic extracts, vegetable oils, or tall oils.

Recycled asphalt pavement (RAP), which is produced through the milling and grinding of demolished roadways, represents an additional low-cost component that also improves the sustainability aspects of the finished product. In the US, approximately 20% of the asphalt mixtures produced contain recycled asphalt pavement (RAP), limited to 20% of the total mix mass by most specifications. RAP is comprised of mineral aggregates adhered by the original aged binder. Asphalt binder is known to age through two processes, a short-term oxidative process due to the elevated temperatures, in the presence of oxygen, employed during the production of the binder and aggregate mixture, and a slower long-term aging process of the finished pavement as it undergoes both physical and chemical changes. The chemistry of the binder is complex, source-dependent and in general may be broken into four categories: asphaltenes, polar aromatics, naphthalene aromatics, and olefins. The asphaltene fraction is composed mainly of polyaromatic particles whose size distribution strongly influences the binder rheology. The latter three categories are generally referred to as maltenes. During aging, the asphaltene/maltene balance shifts towards asphaltenes due to the condensation of aromatics, resulting in an increase in the particle size distribution of the asphaltene fraction.

The oxidized asphaltenes in RAP are well known to cause stiffness and embrittlement. It is well-accepted that RAP utilization has a deleterious effect on the fatigue resistance of the mixture (Gerardu et al., "Recycling of Road Pavement Materials in the Netherlands," *Rijkswaterstaat Commun.* 38:1-148 (1985); Shu et al., "Laboratory Evaluation of Moisture Susceptibility of Foamed Warm Mix Asphalt Containing High Percentages of RAP," *Constr. Build. Mater.* 35:125-130 (2012); Shu et al., "Laboratory Evaluation of Fatigue Characteristics of Recycled Asphalt Mixture," *Constr. Build. Mater.* 22:1323-1330 (2008); Shu et al., "Special Issue on Innovation on Paving Materials," *J. Mater. Civ. Eng.* 29(3):D2017001-1-D2017001-3 (2017); Zhao et al., "Comparative Evaluation of Warm Mix Asphalt Containing High Percentages of Reclaimed Asphalt Pavement," *Constr. Build. Mater.* 44:92-100 (2013); Zhao et al., "Laboratory Performance Evaluation of Warm-Mix Asphalt Containing High Percentages of Reclaimed Asphalt Pavement," *Transp. Res. Rec.* 2294:98-105 (2012)). For these reasons, for RAP addition rates to be between 15% and 25%, it is necessary to provide a virgin binder one SuperPave grade increment lower than specified. Consequently, the environmental and economic benefits of RAP utilization are offset by the need to supply a softer virgin binder. Higher rates of RAP utilization would impose even more stringent requirements on the properties of the base binder. Moreover, while it is well-accepted that upon heating some of the oxidized binder component of RAP softens sufficiently to mix with virgin binder, due to the reduced solubility and elevated viscosity of the aged binder, mixing is incomplete (Bowers et al., "Investigation of Reclaimed Asphalt Pavement Blending Efficiency Through GPC and FTIR," *Constr. Build. Mater.* 50:517-523 (2014)). Reaching a sufficient temperature to promote good RAP mixing with virgin binder also requires an elevated production temperature. This in turn increases oxidative aging, emissions and further limits the ability of current HMA producers to use high RAP content (Silva et al., "Are Totally Recycled Hot Mix Asphalts a Sustainable Alternative for Road Paving?," *Resour. Conserv. Recycl.* 60:38-48 (2012)). Accordingly, RAP utilization is limited to 20% of the total mix by specification requirements by U. S. owner agencies.

Collectively, RAP, VTBs, and LQA sourced binders are desirable for their ability to reduce the cost basis of asphalt binders, but introduce deleterious effects due to the concentration and morphology of their asphaltene content. Of particular import is the failure to meet homogeneity or storage stability criteria, a reduction in MSCR performance and an embrittlement of the binder that damages cold temperature performance. Several "flux" and "rejuvenator" products are currently known to those skilled in the art that address the latter issue. Motor oils, lubricants, vegetable oils, tall oils, fatty acids, and fatty esters are examples of such products which ostensibly function by reducing the viscosity of the maltene matrix (Asli et al., "Investigation on Physical Properties of Waste Cooking Oil—Rejuvenated Bitumen Binder," *Constr. Build. Mater., Non Destructive Techniques for Assessment of Concrete* 37:398-405 (2012)).

This reduction in viscosity compensates for the embrittlement but also decreases high temperature performance. However, there is little to no improvement in binder homogeneity or modification of the asphaltene particle size distribution, which constrains the utilization of RAP, VTBs, and LQA materials. Additionally, flux and rejuvenator products known to the art have a deleterious impact on the elastic recovery of the binder as measured by the MSCR test, which requires further remediation by costly polymer modifiers.

The present application is directed to overcoming these and other deficiencies in the art.

SUMMARY

One aspect of the present application relates to a method of producing an asphalt binder composition. The method comprises:

providing an asphalt binder;
providing a compound of formula (I):

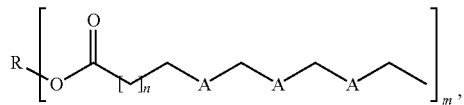

wherein:
each A is selected independently at each occurrence thereof from the group consisting of

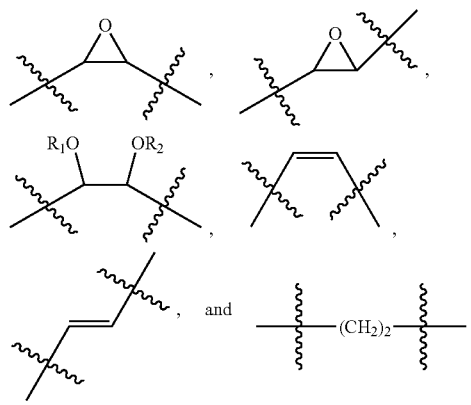

and
wherein at least one A is

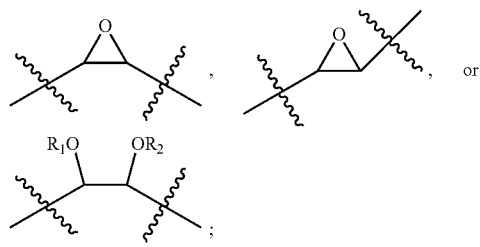

$n=1\text{-}12$;
m is 1, 2, or 3;
each

represents the point of attachment to a —CH$_2$— group;
R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;
wherein the compound of formula (I) has a mass content of oxirane greater than 0.1 and less than 15%;
providing a compound of formula (II):

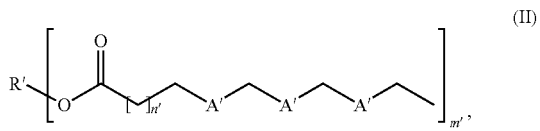

wherein:
each A' is selected independently at each occurrence thereof from the group consisting of

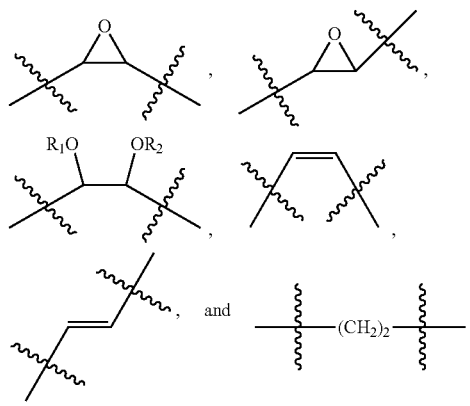

and
wherein at least one A' is

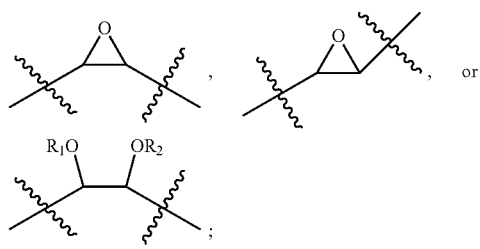

$n'=1\text{-}12$;
m' is 1, 2, or 3;
R' is selected from the group consisting of H, C$_1$-C$_{23}$ alkyl, and benzyl, wherein the C$_1$-C$_{23}$ alkyl can be optionally substituted with an aryl, heteroaryl, or heterocyclyl;

R'$_1$ and R'$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;

wherein the compound of formula (II) has a mass content of oxirane greater than 0.1 and less than 15%; the compound of formula (I) is different from the compound of formula (II); and the ratio of the compound of formula (I) to the compound of formula (II) is 1:1000000 to 1000000:1; and mixing the asphalt binder with the compound of formula (I) and the compound of formula (II) under conditions effective to produce an asphalt binder composition.

Another aspect of the present application relates to a method of producing an asphalt binder composition. The method comprises:

providing an asphalt binder;

providing a polymer comprising two or more units of monomer A, wherein monomer A has a molecular weight of less than 500 Da;

providing a sulfur;

providing a compound of formula (I):

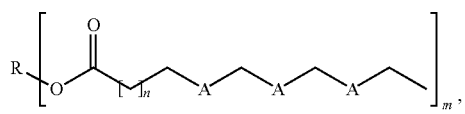

wherein:

each A is selected independently at each occurrence thereof from the group consisting of

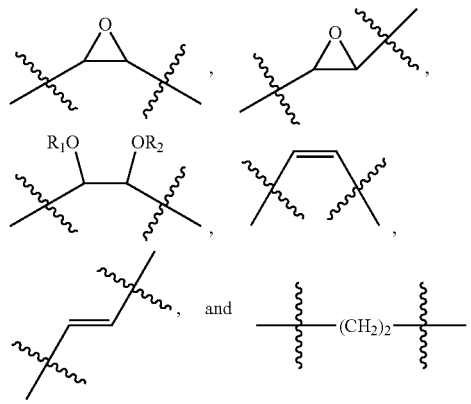

and wherein at least one A is

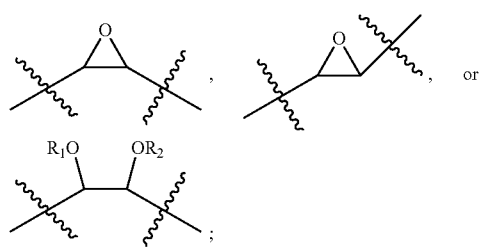

n=1-12;

m is 1, 2, or 3;

each

represents the point of attachment to a —CH$_2$— group;

R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;

R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;

wherein the compound of formula (I) has a mass content of oxirane greater than 0.1 and less than 15%; and mixing the asphalt binder with the polymer comprising two or more units of monomer A, sulfur, and the compound of formula (I) under conditions effective to produce an asphalt binder composition.

Another aspect of the present application relates to an asphalt binder composition comprising:

an asphalt binder;

a compound of formula (I):

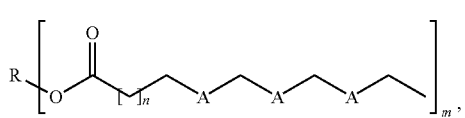

wherein:

each A is selected independently at each occurrence thereof from the group consisting of

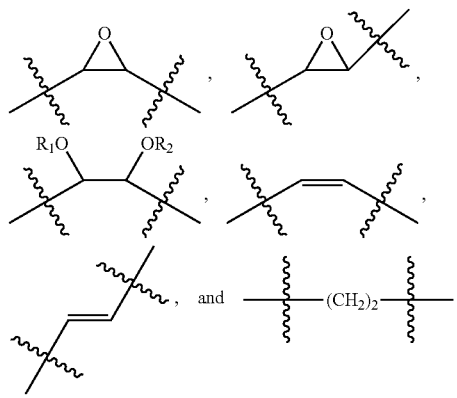

and wherein at least one A is

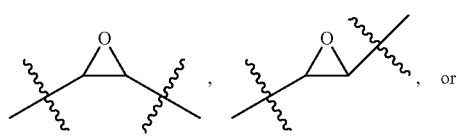

n=1-12;
m is 1, 2, or 3
each represents the point of attachment to a —CH$_2$— group;
R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;
wherein the compound of formula (I) has a mass content of oxirane greater than 0.1 and less than 15%;
a compound of formula (II):

$$R'\left[O-\overset{O}{\underset{\|}{C}}-[\ ]_{n'}-A'-A'-A'\right]_{m'}$$  (II)

wherein:
each A' is selected independently at each occurrence thereof from the group consisting of and
wherein at least one A' is , or n'=1-12;
m' is 1, 2, or 3;
R' is selected from the group consisting of H, C$_1$-C$_{23}$ alkyl, and benzyl, wherein the C$_1$-C$_{23}$ alkyl can be optionally substituted with an aryl, heteroaryl, or heterocyclyl;
R'$_1$ and R'$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;
wherein the compound of formula (II) has a mass content of oxirane greater than 0.1 and less 15% the compound of formula (I) is different from the compound of formula (II); and the ratio of the compound of formula (I) to the compound of formula (II) is 1:1000000 to 1000000:1.

Another aspect of the present application relates to an asphalt binder composition comprising:
an asphalt binder;
a polymer comprising two or more units of monomer A, wherein monomer A has a molecular weight of less than 500 Da;
sulfur;
a compound of formula (I):

$$R\left[O-\overset{O}{\underset{\|}{C}}-[\ ]_{n}-A-A-A\right]_{m}$$  (I)

wherein:
each A is selected independently at each occurrence thereof from the group consisting of and
wherein at least one A is

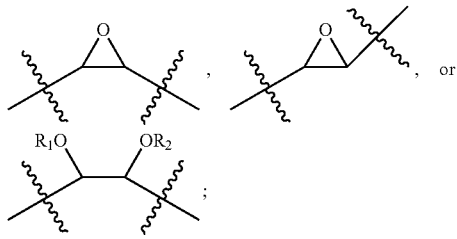

n=1-12;
m is 1, 2, or 3;
each

represents the point of attachment to a —CH$_2$— group; R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;

R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;

wherein the compound of formula (I) has a mass content of oxirane greater than 0.1 and less than 15%.

Another aspect of the present application relates to an asphalt product composition. The composition includes the asphalt binder composition as described herein and a mineral aggregate.

Another aspect of the present application relates to a recycled asphalt pavement aggregate that includes the asphalt binder composition as described herein.

Another aspect of the present application relates to a method of forming a pavement. The method includes (a) providing the asphalt binder composition as described herein; (b) mixing the composition with a mineral aggregate to form a mixture; (c) applying the mixture to a surface to be paved to form an applied paving material, and (d) compacting the applied paving material to form the pavement.

A biobased additive, composed of fully or partially epoxidized triglycerides (e.g. sub-epoxidized soybean oil/SESO) or fully or partially epoxidized fatty acids/esters (e.g. epoxidized methyl soyate/EMS), or a mixture thereof, was used as an asphalt rejuvenator (aiding in asphaltenes solvation and homogenizes blend to enhance performance of asphalt binders). A modified asphalt cement comprised of recycled asphalt pavement (RAP), a VTB, a low quality asphalt (LQA), or a polymer modified asphalt and a polymer from the SBS family, EVA family, or Elvaloy family was produced. Results indicate that biobased additive allows an increase in the use of RAP in blends, shows improved asphaltene solvation, improved homogeneity of blends from VTBs/RAP and improved elastic recovery of asphalt blends from VTBs/RAP, and allowed the creation of asphalt fluxes.

Recent work has shown that fully or partially epoxidized plant oil materials (biobased additives such as sub-epoxidized soybean oil/SESO and epoxidized methyl soyate/EMS) work well as rejuvenators in RAP (aiding in asphaltene solvation and homogenizes the blend to enhance performance of asphalt binders) and as enhancers of polymer modification of neat binders. To better understand why epoxidized plant oil materials have these effects, a series of experiments were undertaken in concern to morphology, solvation, homogenization, and rheology. The epoxidized plant oil materials examined were epoxidized methyl soyate (EMS) and sub-epoxidized soybean oil (SESO). To evaluate changes in morphology small-angle x-ray scattering (SAXS) was done on asphaltenes with and without EMS.

Other testing performed was normal Superpave performance grading, mass loss, low temperature testing and storage stability on polymer-modified asphalt binders. Based on the assumption that EMS and SESO promote disaggregation and solvation of the asphaltenes it was shown through the binder rheology that the more homogeneous polymer networks were formed in the binder during polymer modification, thus, leading to improved elastic recovery. SESO and EMS are very important because they are low cost bio-renewable additives that could be used to improve low temperature performance as well as promote improved polymer network formation in asphalt binders and lead to increased use of lower cost materials such as vacuum tower distillations bottoms (very stiff asphalt binders) as base binders used in general asphalt pavement construction and also act as rejuvenators of RAP. Most materials out in the market as rejuvenator or rejuvenator like materials do not affect asphalt binder chemically, and only act as softening agents which is a way to get stiff binders to pass Superpave criteria. However, these materials may have detrimental long-term effects on the binder as the effect of softening is only temporary and the modified stiff binder would rapidly deteriorate with aging.

DETAILED DESCRIPTION

Figure 1:
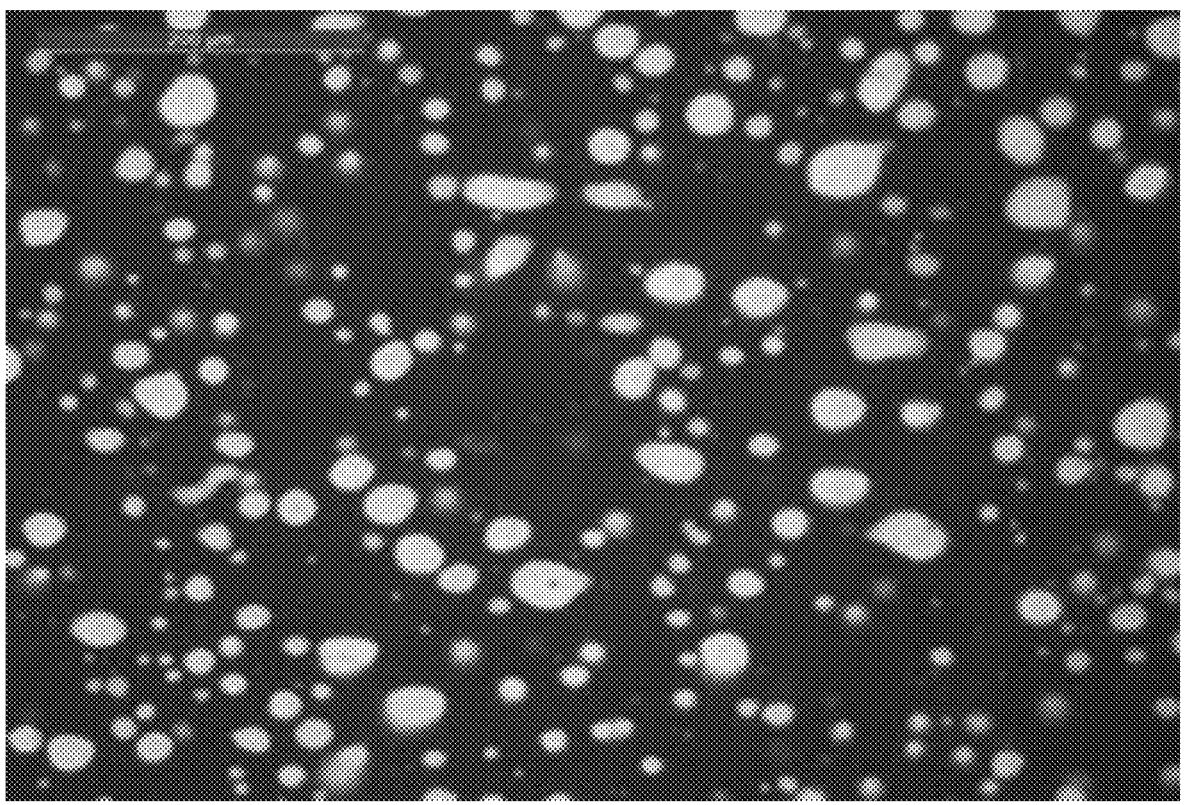
FIG. 1 shows fluorescence optical micrograph of polymer modified asphalt blend with commercial Kraton D1118 (magnification=100×, scale bar=200 μm). The lightly colored spherical particles are SB polymers swollen by the aromatic compounds within the asphalt binder, the dark phase represents the asphalt rich phase (Handle et al., "The Bitumen Microstructure: A Fluorescent Approach," *Mater. Struct.* 49:167-180 (2016); Fernandes et al., "Rheological Evaluation of Polymer-Modified Asphalt Binders," *Mater. Res.* 11:381-386 (2008); tur Rasool et al., "Improving the Aging Resistance of SBS Modified Asphalt with the Addition of Highly Reclaimed Rubber," *Constr. Build. Mater.* 145:126-134 (2017); Liang et al., "Effects of SBS Configuration on Performance of High Modulus Bitumen Based on Dynamic Mechanical Analysis," *Kem. Ind.* 65:379-384 (2016); Alonso et al., "Rheology of Asphalt and Styrene-Butadiene Blends," *J. Mater. Sci.* 45:2591-2597 (2010); Soenen et al., "The Morphology of Bitumen-SBS Blends by UV Microscopy," *Road Mater. Pavement Des.* 9:97-110 (2008); Merusi et al., "A Model Combining Structure and Properties of a 160/220 Bituminous Binder Modified with Polymer/Clay Nanocomposites. A Rheological and Morphological Study," *Mater. Struct.* 47:819-838 (2014), which are hereby incorporated by reference in their entirety). The Kraton 1118D (SB) polymer was dispersed coarsely due to a phase separation of butadiene with the neat asphalt binder (Wen et al., "Improved Properties of SBS-Modified Asphalt with Dynamic Vulcanization," *Polym. Eng. Sci.* 42:1070-1081 (2002), which is hereby incorporated by reference in its entirety).

One aspect of the present application relates to a method of producing an asphalt binder composition. The method comprises:
providing an asphalt binder;
providing a compound of formula (I):

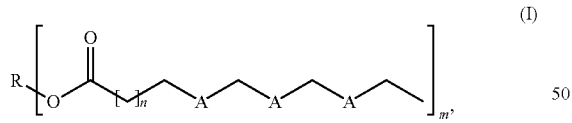

wherein:
each A is selected independently at each occurrence thereof from the group consisting of

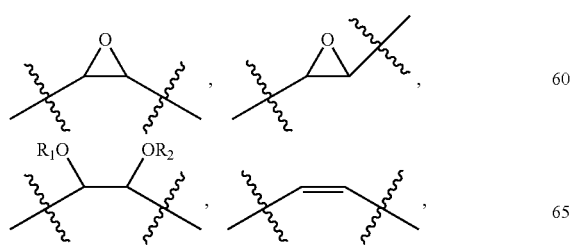

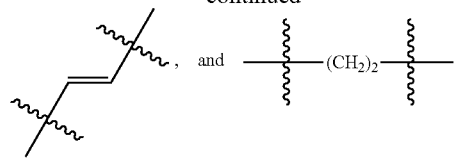

and
wherein at least one A is

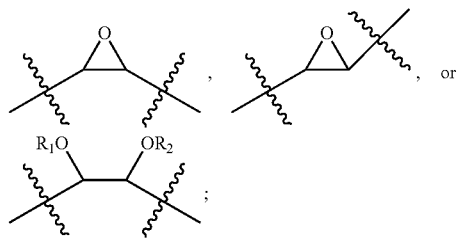

n=1-12;
m is 1, 2, or 3;
each

represents the point of attachment to a —CH$_2$— group;
R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;
wherein the compound of formula (I) has a mass content of oxirane greater than 0.1 and less than 15%;
providing a compound of formula (II):

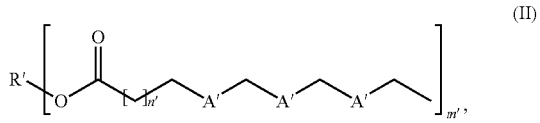

wherein:
each A' is selected independently at each occurrence thereof from the group consisting of

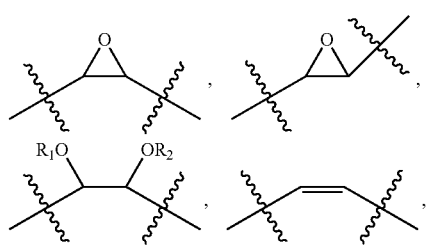

-continued

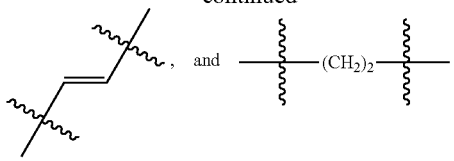

and
wherein at least one A' is

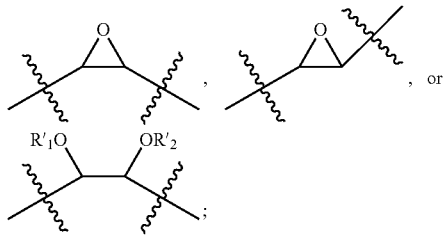

n'=1-12;
m' is 1, 2, or 3;
R' is selected from the group consisting of H, $C_1$-$C_{23}$ alkyl, and benzyl, wherein the $C_1$-$C_{23}$ alkyl can be optionally substituted with an aryl, heteroaryl, or heterocyclyl;
$R'_1$ and $R'_2$ are independently selected from the group consisting of H, $C_1$-$C_{23}$ alkyl and benzyl, wherein the $C_1$-$C_{23}$ alkyl can be optionally substituted with an aryl, heteroaryl, or heterocyclyl;
wherein the compound of formula (II) has a mass content of oxirane greater than 0.1 and less than 15%; the compound of formula (I) is different from the compound of formula (II); and the ratio of the compound of formula (I) to the compound of formula (II) is 1:1000000 to 1000000:1; and
mixing the asphalt binder with the compound of formula (I) and the compound of formula (II) under conditions effective to produce an asphalt binder composition.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "alkyl" means an aliphatic hydrocarbon group which may be straight or branched having about 1 to about 23 carbon atoms in the chain. For example, straight or branched carbon chain could have 1 to 10 carbon atoms. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

The term "benzyl" relates to a benzyl group as shown below

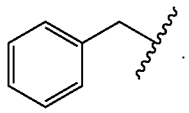 [SMILES: *Cc1ccccc1]

The term "aryl" means an aromatic monocyclic or multicyclic ring system of 6 to about 14 carbon atoms, preferably of 6 to about 10 carbon atoms. Representative aryl groups include phenyl and naphthyl.

The term "heteroaryl" means an aromatic monocyclic or multicyclic ring system of about 5 to about 14 ring atoms, preferably about 5 to about 10 ring atoms, in which one or more of the atoms in the ring system is/are element(s) other than carbon, for example, nitrogen, oxygen, or sulfur. In the case of multicyclic ring system, only one of the rings needs to be aromatic for the ring system to be defined as "heteroaryl," Preferred heteroaryls contain about 5 to 6 ring atoms. The prefix aza, oxa, thia, or thio before heteroaryl means that at least a nitrogen, oxygen, or sulfur atom, respectively, is present as a ring atom. A nitrogen atom of a heteroaryl is optionally oxidized to the corresponding N-oxide. Representative heteroaryls include pyridyl, 2-oxopyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, phthalazinyl, quinoxalinyl, 2,3-dihydro-benzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like.

As used herein, "heterocyclyl" or "heterocycle" refers to a stable 3- to 18-membered ring (radical) which consists of carbon atoms and from one to five heteroatoms selected from the group consisting of nitrogen, oxygen, and sulfur. For purposes of this application, the heterocycle may be a monocyclic, or a polycyclic ring system, which may include fused, bridged, or spiro ring systems; and the nitrogen, carbon, or sulfur atoms in the heterocycle may be optionally oxidized; the nitrogen atom may be optionally quaternized; and the ring may be partially or fully saturated. Examples of such heterocycles include, without limitation, oxiranyl, azepinyl, azocanyl, pyranyl dioxanyl, dithianyl, 1,3-dioxolanyl, tetrahydrofuryl, dihydropyrrolidinyl, decahydroisoquinolyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, 2-oxoazepinyl, oxazolidinyl, oxiranyl, piperidinyl, piperazinyl, 4-piperidonyl, pyrrolidinyl, pyrazolidinyl, thiazolidinyl, tetrahydropyranyl, thiamorpholinyl, thiamorpholinyl sulfoxide, and thiamorpholinyl sulfone. Further heterocycles and heteroaryls are described in Katritzky et al., eds., *Comprehensive Heterocyclic Chemistry: The Structure, Reactions,*

*Synthesis and Use of Heterocyclic Compounds*, Vol. 1-8, Pergamon Press, N.Y. (1984), which is hereby incorporated by reference in its entirety.

The term "monocyclic" used herein indicates a molecular structure having one ring.

The term "polycyclic" or "multicyclic" used herein indicates a molecular structure having two or more rings, including, but not limited to, fused, bridged, or spiro rings.

The term "epoxide" or "oxirane" includes an epoxide ring (i.e., group) as shown below:

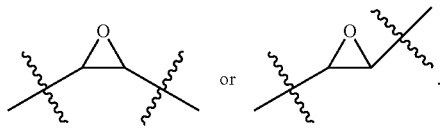 [SMILES: *C1OC1* ; *C1OC1*]

The term "substituted" or "substitution" of an atom means that one or more hydrogen on the designated atom is replaced with a selection from the indicated group, provided that the designated atom's normal valency is not exceeded.

"Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture.

The term "optionally substituted" is used to indicate that a group may have a substituent at each substitutable atom of the group (including more than one substituent on a single atom), provided that the designated atom's normal valency is not exceeded and the identity of each substituent is independent of the others. Up to three H atoms in each residue are replaced with alkyl, halogen, haloalkyl, hydroxy, lower alkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy.

Compounds described herein may contain one or more epoxide (oxirane) rings, and unless specified otherwise, it is intended that the compounds include both cis- or trans-isomers and mixtures thereof. When the compounds described herein contain olefinic double bonds or other centers of geometric asymmetry, and unless specified otherwise, it is intended that the compounds include both E and Z geometric isomers.

Asphalt includes material in which the predominating constituents are bitumens, which occur in nature or are obtained in petroleum processing. Bitumens include solid, semisolid, or viscous substances, natural or manufactured, composed principally of high molecular weight hydrocarbons. The asphalt used in the present application is not particularly limited, and various kinds of asphalts may be used in the present application. Examples of the asphalt include straight asphalts such as petroleum asphalts for pavements, as well as polymer-modified asphalts produced by modifying asphalt with a polymer material including a thermoplastic elastomer such as styrene/butadiene block copolymers (SBS), styrene/isoprene block copolymers (SIS), and ethylene/vinyl acetate copolymers (EVA).

Suitable grades of asphalt include, but are not limited to, the following: PG52-22, PG58-22, PG64-22, PG67-22, PG70-22, PG76-22, PG82-22, PG52-28, PG58-28, PG64-28, PG67-28, PG70-28, PG76-28, PG52-34, PG58-34, PG64-34, PG64-16, PG67-16, PG70-16, PG76-16, PG64-10, PG67-10, PG70-10, PG76-10, pen grade 40-50, pen grade 60-70, pen grade 85-100, pen grade 120-150, AR4000, AR8000, AC10 grade, AC20 grade, and AC30 grade. Roberts et al., "Hot Mix Asphalt Materials, Mixture Design, and Construction," *NAPA Research and Education Foundation* (2nd ed.) (1996), which is hereby incorporated by reference in its entirety.

Renewable source-derived fats and oils comprise glycerol triesters of fatty acids. These are commonly referred to as "triglycerides" or "triacylglycerols ("TAG")." Fats and oils are usually denoted by their biological source and contain several different fatty acids typical for each source. For example, the predominant fatty acids of soybean oil are the unsaturated fatty acids oleic acid, linoleic acid, and linolenic acid, and the saturated fatty acids palmitic acid and stearic acid. Other fatty acids are present at low levels. Triglycerides are the main component of natural oils and are composed of three fatty acids groups connected by a glycerol center. Epoxidized triglycerides can be found as such in nature, for instance in *Vernonia* plants, or can be conveniently synthesized from more common unsaturated oils by using a standard epoxidation process. See U.S. Patent Publ. No. 20120156484 to Vendamme et al., which is hereby incorporated by reference in its entirety.

Unsaturated fatty acids are susceptible to epoxidation to form fatty acids bearing epoxide rings. Thus, triglycerides containing unsaturated fatty acids can be subjected to epoxidation to form epoxidized triglycerides in which one, two, or all three fatty acids bear at least one epoxide ring. Diglycerides (diacylglycerols, "DAG") are obtained when one fatty acid is removed from a triglyceride, typically by hydrolysis; monoglycerides (monoacylglycerols, "MAG") are obtained when two fatty acids are removed from a triglyceride.

A compound of formula (I) and a compound of formula (II) according to the present application are fully or partially epoxidized, which means that at least one of the double bonds of the unsaturated fatty acid ester in the compound of formula (I) and the compound of formula (II) is oxidized to an epoxy group. Such oxidations are well known in the art and can be readily accomplished in an industrial scale, e.g., by using hydrogen peroxide and a carboxylic acid (e.g., formate or acetate), or by the halohydrin method. It is understood by those skilled in the art that in practice, epoxidized compounds of formula (I) and formula (II) may contain various quantities of by-products arising from hydrolysis or rearrangement of epoxides and from cross-linking of the fatty acid chains. Use of epoxidized compounds of formula (I) and formula (II) containing small quantities of epoxidation by-products and epoxide decomposition by-products is included within the scope of the present application. See WO 2007062158 to Selifonov, which is hereby incorporated by reference in its entirety.

Epoxidized compounds of formula (I) and formula (II) can be subjected to esterification reactions with polyhydric alcohols (such as sugars, sugar acids, glycerol and glycols) to form epoxidized esters of polyols, or with monohydric alcohols (such as benzyl alcohol, methanol, ethanol, propanols, butanols and longer alcohols, furan-containing alcohols (such as tetrahydro-2-furanmethanol and 2-furanmethanol), glycidol, and fusel oil) to form epoxidized monoesters.

Alternatively, epoxidized esters of polyols or of monohydric alcohols can be obtained by subjecting the esters to epoxidation.

In addition, triglyceride oils have long been subjected to a process called "blowing" to make blown oils. In this process, the triglycerides are heated in the presence of air or oxygen (often blown through the oil). The double bonds of the fatty acids in the oils react to form both epoxides and dimers of the oils. The epoxidized crosslinked oil can be subjected to hydrogenation (a common vegetable oil process for removing double bonds from oils) to yield asphalt modifiers. Useful processes are described in U.S. Pat. Nos. 7,994,107, 8,198,223, and 8,198,224 to Bloom, all of which are hereby incorporated by reference in their entirety.

Renewable source derived fats and oils include algal oil, animal fat, beef tallow, borneo tallow, butterfat, camelina oil, candlefish oil, canola oil, castor oil, cocoa butter, cocoa butter substitutes, coconut oil, cod-liver oil, colza oil, coriander oil, corn oil, cottonseed oil, false flax oil, flax oil, float grease from wastewater treatment facilities, hazelnut oil, hempseed oil, herring oil, illipe fat, jatropha oil, kokum butter, lanolin, lard, linseed oil, mango kernel oil, marine oil, meadowfoam oil, menhaden oil, microbial oil, milk fat, mowrah fat, mustard oil, mutton tallow, neat's foot oil, olive oil, orange roughy oil, palm oil, palm kernel oil, palm kernel olein, palm kernel stearin, palm olein, palm stearin, peanut oil, phulwara butter, pile herd oil, pork lard, radish oil, ramtil oil, rapeseed oil, rice bran oil, safflower oil, sal fat, salicornia oil, sardine oil, sasanqua oil, sesame oil, shea fat, shea butter, soybean oil, sunflower seed oil, tall oil, tallow, tigernut oil, tsubaki oil, tung oil, triacylglycerols, triolein, used cooking oil, vegetable oil, walnut oil, whale oil, white grease, yellow grease, and derivatives, conjugated derivatives, genetically-modified derivatives, and mixtures of any thereof. In one embodiment, the compound of formula (I) and/or formula (II) is derived from sources selected from the group consisting of fish oil, animal oil, vegetable oil, synthetic and genetically-modified plant oils, and mixtures thereof. Examples of vegetable oil include high erucic acid rapeseed oil, safflower oil, canola oil, castor oil, sunflower oil, and linseed oil. In another embodiment, the compound of formula (I) and/or formula (II) is derived from a source other than soybean oil or corn oil.

The compound of formula (I) and formula (II) of the present application may be modified or unmodified, partially or fully epoxidized, non-epoxidized, or partially or fully hydrogenated. In one embodiment, the compound of formula (I) and/or formula (II) is methylated, hydrogenated, and/or hydrolyzed. The fatty acid esters of the present application may be derived from a plant oil, animal fat, or a synthetic triglyceride.

In one embodiment, the compound of formula (I) is partially epoxidized. The mass content of the oxirane in the partially epoxidized compound of formula (I) is between 0.1 and 15%. Preferably, the mass content of the oxirane in the compound of formula (I) is between 0.1 and 12%; between 0.1 and 10%; between 0.1 and 5%; between 0.5 and 5%; between 0.5 and 4%; between 1 and 4%; between 1 and 3%. More preferably, the mass content of the oxirane in the compound of formula (I) is between 1.25 and 2.75%.

In another embodiment, the compound of formula (II) is partially epoxidized. The mass content of the oxirane in the partially epoxidized compound of formula (II) is between 0.1 and 15%. Preferably, the mass content of the oxirane in the compound of formula (II) is between 0.1 and 12%; between 0.1 and 10%; between 0.1 and 5%; between 0.5 and 5%; between 0.5 and 4%; between 1 and 4%; between 1 and 3%. More preferably, the mass content of the oxirane in the compound of formula (II) is between 1.25 and 2.75%.

The mass content of the oxirane or oxirane oxygen content (also referred to herein as % oxirane oxygen or wt % of oxirane) of the compounds of Formula (I) and Formula (II) may be determined by using Official Method, Standard Cd 9-57 of the American Oil Chemists' Society ("Oxirane Oxygen in Epoxidized Materials" Official Method Cd 9-57 by the American Oil Chemist' Society (Reapproved 2017), which is hereby incorporated by reference in its entirety.

$$\text{Oxirane oxygen,} \quad \text{Equation 1}$$
$$\% = \frac{\text{mL } HBr \text{ to titrate test portion} \times M \times 1.60}{\text{mass of test portion, g}}$$

Where –

$M$ = Molarity of $HBr$ solution

For example, oxirane oxygen content for epoxidized soybean oil may be about 7.5% and for sub-epoxidized soybean oil may be about 5.2%. The functionality is the number of epoxide groups per molecule. The functionality of epoxidized soybean oil in accordance with the present application may be approximately 4.5 and sub-epoxidized soybean oil may be approximately 2.1.

In one embodiment, the compound of formula (I) is the compound of formulae (Ia)-(Ik):

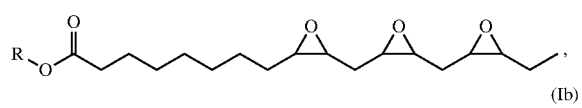
(Ia)

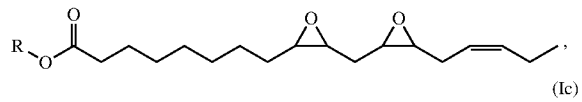
(Ib)

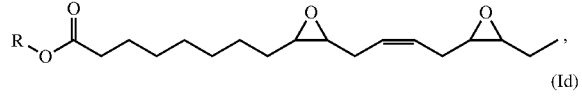
(Ic)

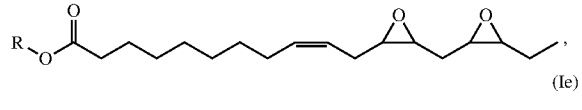
(Id)

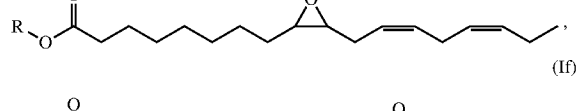
(Ie)

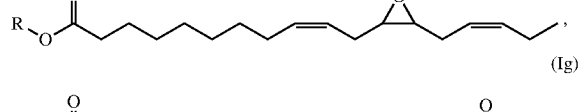
(If)

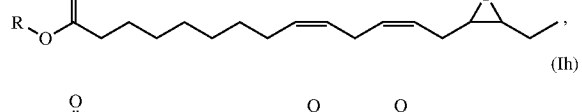
(Ig)

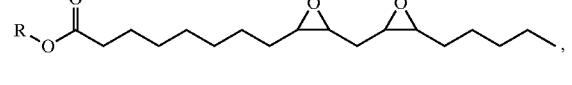
(Ih)

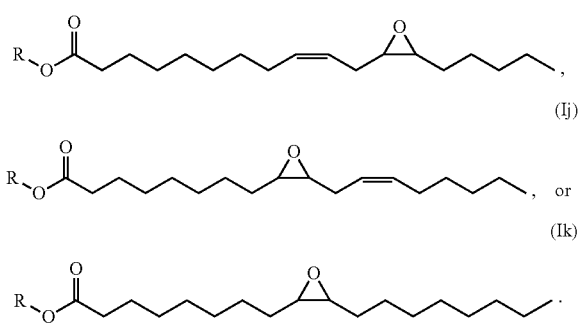

In another embodiment, the compound of formula (II) is the compound of formulae (IIa)-(IIk):

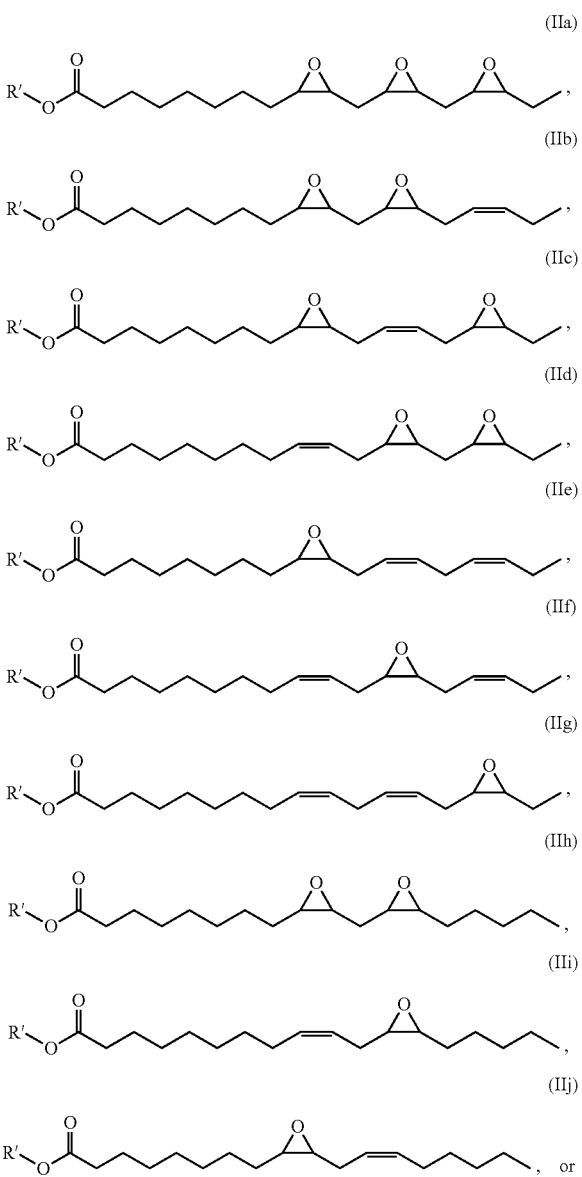

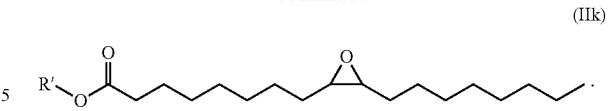

The fatty acid esters derived from plant or animal oil of the present application may be polymerized. The polymerized plant oil or animal oil can be subsequently partially or fully saturated via a catalytic hydrogenation post-polymerization. The monomeric oils used in the compounds of formula (I) and formula (II) can be any triglycerides or triglyceride mixtures that are radically polymerizable. These triglycerides or triglyceride mixtures are typically plant oils. Suitable plant oils include, but are not limited to, a variety of vegetable oils such as soybean oil, peanut oil, walnut oil, palm oil, palm kernel oil, sesame oil, sunflower oil, safflower oil, rapeseed oil, linseed oil, flax seed oil, colza oil, coconut oil, corn oil, cottonseed oil, olive oil, castor oil, false flax oil, hemp oil, mustard oil, radish oil, ramtil oil, rice bran oil, salicornia oil, tigernut oil, tung oil, etc., and mixtures thereof. Typical vegetable oil used herein includes soybean oil, linseed oil, corn oil, flax seed oil, or rapeseed oil, and the resulting compounds of formula (I) and/or formula (II) is polymerized triglyceride or triglyceride derivatives.

Suitable epoxidized compounds of formula (I) and formula (II) according to the present application include, but are not limited to, epoxidized benzyl soyate and epoxidized isoamyl soyate. Others include epoxidized methyl soyate, epoxidized soybean oil, sub-epoxidized soybean oil, epoxidized corn oil, and sub-epoxidized corn oil. In one embodiment, the compound of formula (I) is epoxidized methyl soyate. In another embodiment, the compound of formula (II) is epoxidized methyl soyate. In another embodiment, the compound of formula (I) is epoxidized benzyl soyate. In yet another embodiment, the compound of formula (II) is epoxidized benzyl soyate. In yet another embodiment, the compound of formula (I) is epoxidized isoamyl soyate. In a further embodiment, the compound of formula (II) is epoxidized isoamyl soyate. In yet another embodiment, the compound of formula (I) is sub-epoxidized soybean oil. In a further embodiment, the compound of formula (II) is sub-epoxidized soybean oil. In yet another embodiment, the compound of formula (I) is sub-epoxidized corn oil. In a further embodiment, the compound of formula (II) is sub-epoxidized corn oil. The fatty acid esters may also include, for example, epoxidized methyl linoleate; benzyl, ethyl, fusel oil, furanoic alcohols (tetrahydro-2-furanmethanol and 2-furanmethanol), glycidol, SBO TAG, DAG, MAG, glycols, and blown oils such as the above-mentioned linseed oil, rapeseed oil, castor oil and soybean oil. The improved asphalt may include one or more specific compounds from those encompassed by the compound of formula (I) and formula (II).

Epoxidized triglycerides are commercially available. See U.S. Patent Publ. No. 20120156484 to Vendamme et al., which is hereby incorporated by reference in its entirety. For example, epoxidized linseed oil (ELO) is available from Cognis (Dusseldorf, Germany) under the trade name DEHYSOL B316 SPEZIAL, or Arkema (King of Prussia, Pa.) under the trade name VIKOFLEX 7190. An exemplary structure of an epoxidized triglyceride of linseed oil is as follows:

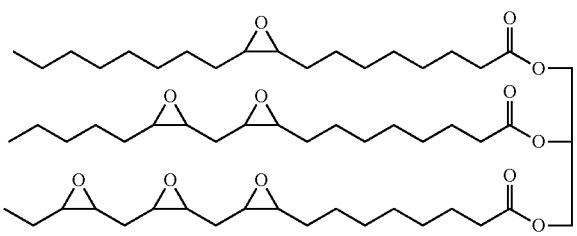 [SMILES: CCCCCCCCC1OC1CCCCCCCC(=O)OCC(COC(=O)CCCCCCCC1OC1CC1OC1CC1OC1CC)OC(=O)CCCCCCCC1OC1CC1OC1CCCCC]

Epoxidized soybean oil (ESBO) is commercially available from Cognis (Dusseldorf, Germany) under the trade name DEHYSOL D82, or from Arkema (King of Prussia, Pa.) under the trade name VIKOFLEX 7170. See U.S. Patent Publ. No. 20120156484 to Vendamme et al., which is hereby incorporated by reference in its entirety.

Methods of making epoxidized benzyl soyate and epoxidized isoamyl soyate are known in the art and would be readily available to one skilled in the art. Likewise, methods of making benzyl soyate and other benzoate compounds are also known in the art. See e.g., U.S. Pat. No. 9,000,196 to Hagberg et al., and U.S. Pat. No. 6,797,753 to Benecke et al, both of which are hereby incorporated by reference in their entirety. Soyate relates to a mixture of fatty esters derived from soybean oil. For example, "benzyl soyate" describes the product of the reaction of making benzyl esters of soybean oil, and "isoamyl soyate" describes the product of the reaction of making isoamyl esters of soybean oil. Further examples of materials that may, in some embodiments, be used in accordance with the present application include:

epoxidized soybean oil by alcoholysis, see U.S. Pat. No. 3,070,608 to Kuester et al., which is hereby incorporated by reference in its entirety.

Reduced color epoxidized fatty acid esters (such as epoxidized benzyl soyate and epoxidized isoamyl soyate) according to the present application can be made from an epoxidized natural fat or oil (such as epoxidized soybean oil) through the inclusion of borohydride in either a transesterification process or in an interesterification process. See U.S. Patent Publ. No. 2014/0113999 to Howard et al., which is hereby incorporated by reference in its entirety.

In accordance with the present application, the addition of the borohydride and starting from an epoxidized natural fat or oil does not to detract in a material way from the other commercially-relevant performance attributes of a plasticized polymer composition incorporating such a reduced color epoxidized fatty acid ester, as compared to an equivalent composition prepared using an epoxidized fatty acid ester made according to the methods known in the art. Given the indication in the WO 2009/102877 to Eaton, which is hereby incorporated by reference in its entirety, that epoxides made from esters of fatty acids such as the epoxidized benzyl or isoamyl ester of soy oil are often too volatile to serve as useful plasticizers of PVC, this was a finding of considerable significance for the specific reduced color epoxidized fatty acid ester, epoxidized benzyl soyate (EBS) and epoxidized isoamyl soyate (EIS). Rather than being dependent on the production economics or availability of biodiesel, which are in turn to some extent dependent on fuels demand, pricing, and usage patterns, EBS and EIS could be made with an available supply of epoxidized

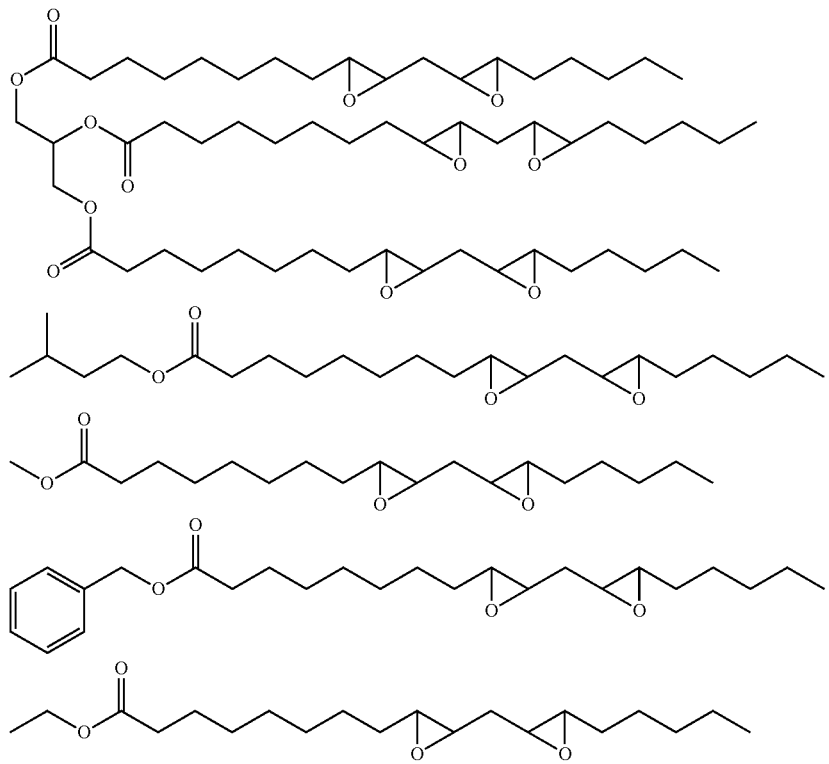

Epoxidized benzyl soyate esters and isoamyl esters are known to those skilled in the art to be made starting from soybean oil—the supply and demand for which is at least to some extent related to demand for the same plasticized PVC compositions in which ESO can be used as a secondary plasticizer and thermal stabilizer, and not to conditions in the fuel markets.

Alternatively, epoxidized compounds of formula (I) and/or formula (II) (especially of benzyl alcohol) of the present application can be made from fats or oils by the process of transesterifying a low moisture epoxidized natural fat or oil by combination with a first alcohol in the presence of a transesterification catalyst and under conditions which are effective for carrying out the transesterification reaction. After the resultant product mixture from the reaction of the first alcohol and low moisture epoxidized natural fat or oil phase separates into an epoxidized fatty acid ester phase and a second phase comprising byproduct glycerol, the second phase is substantially removed. The epoxidized fatty acid esters in the epoxidized fatty acid ester phase from the first transesterification step are combined with more of the first alcohol and with a second alcohol which includes 5 to 7 members in a ring structure in the presence of a transesterification catalyst and under conditions effective for forming epoxidized fatty acid esters of the second alcohol in a second transesterification step. The first alcohol is continuously removed during the second transesterification step. See U.S. Patent Publ. No. 2015/0225358 to Howard et al., which is hereby incorporated by reference in its entirety. Sodium borohydride may also be incorporated into the process to make lighter materials, if necessary.

Epoxidized compounds of formula (I) and formula (II) of the present application, particularly benzyl esters, may be in the form of a composition comprising one or more unsaturated fatty acid esters of alcohols which include a five to seven-member ring structure. That composition contains not more than about 5.0 percent by weight of the total weight of material of monoglycerides and diglycerides combined and can be made by the process disclosed in U.S. Pat. No. 8,703,849 to Hagberg et al., which is hereby incorporated by reference in its entirety.

The asphalt binder of the present application may contain anywhere from 0.1% to 99% by weight compounds of formula (I). Preferably, the asphalt binder contains from about 0.1% to about 40% by weight compounds of formula (I). Preferably, the asphalt binder contains from about 0.1% to about 10% by weight compounds of formula (I). More preferably, the asphalt binder contains from about 1.25% to about 3.9% by weight compounds of formula (I). More preferably, the asphalt binder contains from about 1.25% to about 2.75% by weight compounds of formula (I). For example, the asphalt binder may contain about 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 5%, 6%, 7%, 8%, 9%, 25%, 40%, 50%, 60%, 70%, 80%, 90, or 99% by weight compounds of formula (I).

The asphalt binder of the present application may also contain anywhere from 0% to 99% by weight compounds of formula (II). Preferably, the asphalt binder contains from about 0% to about 40% by weight compounds of formula (II). Preferably, the asphalt binder contains from about 0.1% to about 10% by weight compounds of formula (II). More preferably, the asphalt binder contains from about 1.5% to about 3.9% by weight compounds of formula (II). For example, the asphalt binder may contain about 0%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 5%, 6%, 7%, 8%, 9%, 25%, 40%, 50%, 60%, 70%, 80%, 90, or 99% by weight compounds of formula (II).

In one embodiment, the compound of formula (I) is mixed in an amount of 5.0 to 99.0 wt % with the asphalt binder to form a master batch. The master batch is a highly concentrated sample of the improved asphalt, which can be shipped for further dilution with asphalt and be applied. The master batch can be further mixed with asphalt to form a composition containing an amount of 0.1 to 15.0 wt % of the compound of formula (I) for direct application of the improved asphalt.

In another embodiment, the compound of formula (II) is added to the master batch containing a compound of formula (I). This master batch can be further mixed with asphalt to form a composition containing an amount of 0.1 to 15.0 wt % of the compound of formula (I) and 0.1 to 15.0 wt % of the compound of formula (II) for direct application of the improved asphalt.

In one embodiment, the mixing comprises forming a master batch comprising the compound of formula (I), the compound of formula (II), and the asphalt binder, wherein the compound of formula (I) and the compound of formula (II) are present in the master batch in an amount of 5.0 to 99.0 wt %.

Asphalt binder that can be used according to the present application includes unaged asphalt binder, aged asphalt binder from recycled asphalt pavement, vacuum tower distillation bottom binder, aged asphalt binder from recycled asphalt shingles, de-asphalting bottoms, residuum oil supercritical extraction unit bottoms, and mixtures thereof.

In one embodiment, the asphalt binder is provided in the form of the asphalt, such as recycled asphalt pavement. In this embodiment, a modified asphalt is produced.

In at least one embodiment, the method of producing an asphalt binder composition further includes providing a polymer and mixing the asphalt binder composition with the polymer.

Suitable polymers that can be used in accordance with the present application include styrene-butadiene type polymer, polyethylenes, oxidized polyethylenes, polyolefins, PE homopolymers, and the like. The polymer additive can include low molecular weight polymers, such as low, medium, or high density polyethylenes having a maximum viscosity of 1000 cps at 140° C. Other suitable polymers would include ethylenes and polypropylenes with melting points below 140° C. The polymer additive is preferably added at a concentration of up to about 1%, 5%, 10%, 15%, 20%, 25%, and 50% by weight of the improved asphalt.

In at least one embodiment, the polymer is a styrene-butadiene type polymer selected from the group consisting of SB rubber, SBS linear type, SBS radial type, and SB sulphur linked type polymers, and the like. The asphalt binder optionally includes up to about 5% by weight styrene-butadiene type polymer. Any suitable polymer or mixture of different polymers can be used in producing polymer-modified asphalt. Non-limiting examples of suitable polymers include polyethylene, polypropylene, styrene/butadiene/styrene triblock copolymer, styrene/ethylene-butylene/styrene triblock copolymer, epoxy modified acrylate copolymer, ethylene/vinyl acetate copolymer, or mixture thereof.

In at least one embodiment, the method of producing an asphalt binder composition further includes mixing the asphalt binder composition with a carboxyl additive.

In various embodiments, the present application includes a product produced by the methods described herein.

In the present application, the term asphalt product includes a warm-melt flowable mixture of warm-mix binder of bituminous type optionally together with mineral filler. An asphalt product does not need to be roller compacted when implemented. It should thus be easily cast and spread. Examples of asphalt products include, in particular, asphalts, sealants, pavement seals, and heat-sealing materials.

Another aspect of the present application relates to a method of producing an asphalt binder composition. The method comprises:

providing an asphalt binder;

providing a polymer comprising two or more units of monomer A, wherein monomer A has a molecular weight of less than 500 Da;

providing sulfur;

providing a compound of formula (I):

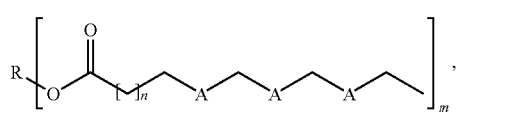

wherein:

each A is selected independently at each occurrence thereof from the group consisting of

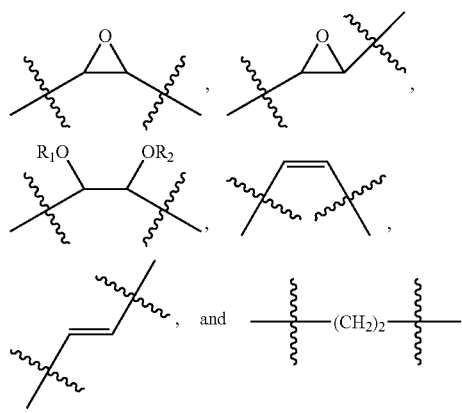

and wherein at least one A is

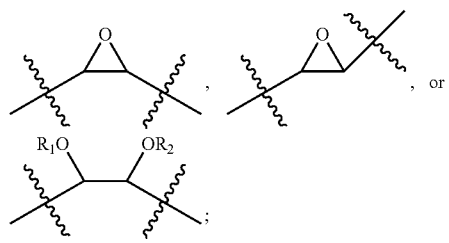

n=1-12;

m is 1, 2, or 3;

each

represents the point of attachment to a —CH$_2$— group;

R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;

R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;

wherein the compound of formula (I) has a mass content of oxirane greater than 0.1 and less than 15%; and mixing the asphalt binder with the polymer comprising two or more units of monomer A, sulfur, and the compound of formula (I) under conditions effective to produce an asphalt binder composition.

In one embodiment, monomer A is not a radically polymerizable plant oil, animal oil, synthetic triglyceride, or mixture thereof.

Monomer A, according to the present application, has a molecular weight of less than 1000 Da. Preferably, Monomer A has a molecular weight of less than 900 Da, less than 800 Da, less than 700 Da, less than 600 Da, less than 500 Da, less than 450 Da, less than 400 Da, less than 350 Da, less than 300 Da, less than 250 Da, less than 200 Da, less than 150 Da, less than 100 Da, less than 50 Da. More preferably, Monomer A has a molecular weight of less than 500 Da.

In one embodiment, the polymer consists of monomers A that are the same. In another embodiment, the polymer consists of monomers A that are different.

In at least one embodiment, the polymer comprises two or more units of monomer A and two or more units of monomer B.

Monomer B, according to the present application, has a molecular weight of less than 1000 Da. Preferably, Monomer B has a molecular weight of less than 900 Da, less than 800 Da, less than 700 Da, less than 600 Da, less than 500 Da, less than 450 Da, less than 400 Da, less than 350 Da, less than 300 Da, less than 250 Da, less than 200 Da, less than 150 Da, less than 100 Da, less than 50 Da. More preferably, Monomer B has a molecular weight of less than 500 Da.

Polymers that can be used to prepare an asphalt binder composition include, but are not limited to, polyolefins, Vestenemer, the Elvaloy series, SBR (styrene-butadiene rubber), polydienes, polyacrylates, polyvinyls, polyester, and polyamides.

Monomer A or monomer B can be each independently a vinyl, acrylic, diolefin, nitrile, dinitrile, acrylonitrile monomer, or monomer with reactive functionality, or crosslinking monomer.

Exemplary vinyl aromatic monomers include styrene, α-methyl styrene, t-butyl styrene, vinyl xylene, vinyl naphthalene, vinyl pyridine, divinyl benzene, N-vinyl heteroaromatics (such as 4-vinylimidazole (Vim), N-vinylcarbazole (NVC), N-vinylpyrrolidone, etc.). Other exemplary vinyls include vinyl esters (such as vinyl acetate (VAc), vinyl butyrate (VB), vinyl benzoate (VBz)), N-vinyl amides and imides (such as N-vinylcaprolactam (NVCL), N-vinylpyrrolidone (NVP), N-vinylphthalimide (NVPI), etc.), vinylsulfonates (such as 1-butyl ethenesulfonate (BES), neopentyl ethenesulfonate (NES), etc.), vinylphosphonic acid (VPA), haloolefins (such as vinylidene fluoride (VF2)), etc. Exemplary methacrylates include C1-C6 (meth)acrylate (i.e., methyl methacrylate, ethyl methacrylate, propyl (meth) acrylate, butyl (meth)acrylate, isobutyl methacrylate, heptyl (meth)acrylate, or hexyl (meth)acrylate), 2-(acetoacetoxy) ethyl methacrylate (AAEMA), 2-aminoethyl methacrylate (hydrochloride) (AEMA), allyl methacrylate (AMA), cholesteryl methacrylate (CMA), t-butyldimethylsilyl methacrylate (BDSMA), (diethylene glycol monomethyl ether) methacrylate (DEGMA), 2-(dimethylamino)ethyl methacrylate (DMAEMA), (ethylene glycol monomethyl ether) methacrylate (EGMA), 2-hydroxyethyl methacrylate (HEMA), dodecyl methacrylate (LMA), methacryloyloxyethyl phosphorylcholine (MPC), (poly(ethylene glycol) monomethyl ether) methacrylate (PEGMA), pentafluorophenyl methacrylate (PFPMA), 2 (trimethylamonium)ethyl methacrylate (TMAEMA), 3-(trimethylamonium)propyl methacrylate (TMAPMA), triphenylmethyl methacrylate (TPMMA), etc. Other exemplary acrylates include 2-(acryloyloxy)ethyl phosphate (AEP), butyl acrylate (BA), 3-chloropropyl acrylate (CPA), dodecyl acrylate (DA), di(ethylene glycol) 2-ethylhexyl ether acrylate (DEHEA), 2-(dimethylamino)ethyl acrylate (DMAEA), ethyl acrylate (EA), ethyl α-acetoxyacrylate (EAA), ethoxyethyl acrylate (EEA), 2-ethylhexyl acrylate (EHA), isobornyl acrylate (iBoA), methyl acrylate (MA), propargyl acrylate (PA), (poly(ethylene glycol) monomethyl ether) acrylate (PEGA), tert-butyl acrylate (tBA), etc. Exemplary methacrylamides include N-(2-aminoethyl)methacrylamide (hydrochloride) (AEMAm) and N-(3-aminopropyl)methacrylamide (hydrochloride) (APMAm), N (2 (dimethylamino)ethyl)acrylamide (DEAPMAm), N-(3-(dimethylamino)propyl)methacrylamide (hydrochloride) (DMAPMAm), etc. Other exemplary acrylamides include acrylamide (Am), 2-acrylamido-2-methylpropanesulfonic acid sodium salt (AMPS), N-benzylacrylamide (BzAm), N-cyclohexylacrylamide (CHAm), diacetone acrylamide (N-(1,1-dimethyl-3-oxobutyl) acrylamide) (DAAm), N,N-diethylacrylamide (DEAm), N,N-dimethylacrylamide (DMAm), N (2 (dimethylamino)ethyl) acrylamide (DMAEAm), N-isopropylacrylamide (NIPAm), N octylacrylamide (OAm), etc. Exemplary nitriles include acrylonitrile, adiponitrile, methacrylonitrile, etc. Exemplary diolefins include butadiene, isoprene, etc.

A more extensive list of exemplary methacrylate monomers, acrylate monomers, methacrylamide monomers, acrylamide monomers, styrenic monomers, diene monomers, vinyl monomers, monomers with reactive functionality, and crosslinking monomers that are suitable for usage as the radically polymerizable monomers herein has been described in Moad et al., "Living Radical Polymerization by the Raft Process—a Third Update," *Australian Journal of Chemistry* 65: 985-1076 (2012), which is hereby incorporated by reference in its entirety.

In one embodiment, the polymer is SBS.

In another embodiment, the polymer is ethylene vinyl acetate.

In another embodiment, the polymer is SBR (styrene-butadiene rubber).

According to the present application, the asphalt binder of the present application contains sulfur in an amount of anywhere from 0.0001% to 1% by weight. Preferably, the asphalt binder contains about 0%, 0.005%, 0.05%, 0.1%, 0.2%, 0.3%, 0.4%, 0.5%, 0.6%, 0.7%, 0.8%, 0.9%, or 1% of sulfur by weight. More preferably, the asphalt binder contains about 0.2% of sulfur by weight.

Another aspect of the present application relates to an asphalt binder composition comprising:
an asphalt binder;
a compound of formula (I):

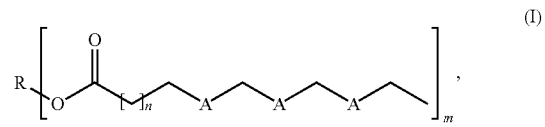

wherein:
each A is selected independently at each occurrence thereof from the group consisting of

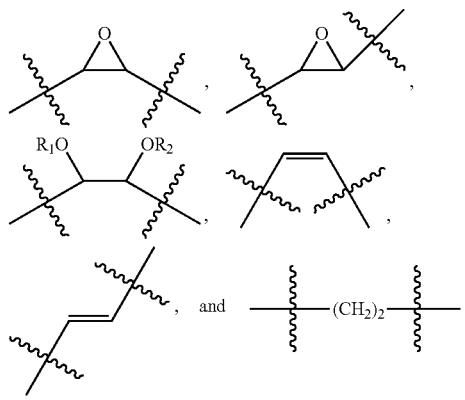

and
wherein at least one A is

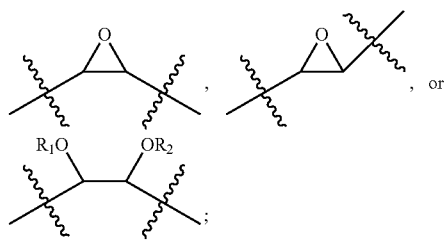

n=1-12;
m is 1, 2, or 3;
each

represents the point of attachment to a —CH$_2$— group;
R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;
wherein the compound of formula (I) has a mass content of oxirane greater than 0.1 and less than 15%;

a compound of formula (II):

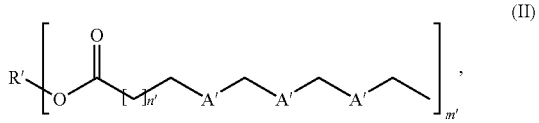

wherein:
each A' is selected independently at each occurrence thereof from the group consisting of

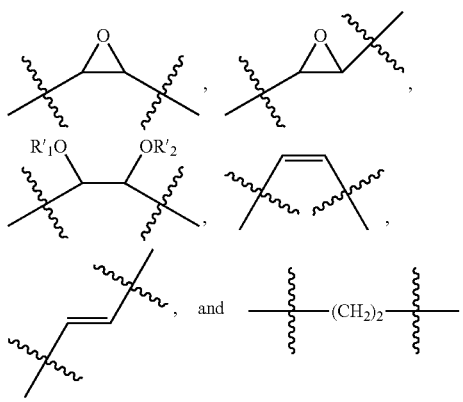

and
wherein at least one A' is

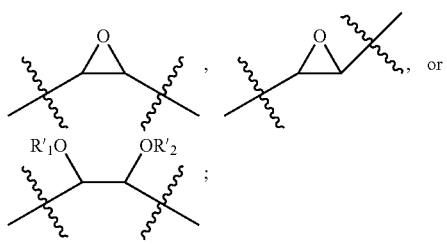

n'=1-12;
m' is 1, 2, or 3;
R' is selected from the group consisting of H, $C_1$-$C_{23}$ alkyl, and benzyl, wherein the $C_1$-$C_{23}$ alkyl can be optionally substituted with an aryl, heteroaryl, or heterocyclyl;
$R'_1$ and $R'_2$ are independently selected from the group consisting of H, $C_1$-$C_{23}$ alkyl and benzyl, wherein the $C_1$-$C_{23}$ alkyl can be optionally substituted with an aryl, heteroaryl, or heterocyclyl;
wherein the compound of formula (II) has a mass content of oxirane greater than 0.1 and less than 15%; the compound of formula (I) is different from the compound of formula (II); and the ratio of the compound of formula (I) to the compound of formula (II) is 1:1000000 to 1000000:1.

In at least one embodiment, the asphalt binder composition further includes a polymer.

The asphalt and compound of formula (I) and formula (II) used in this aspect of the present application are described above.

Another aspect of the present application relates to an asphalt binder composition comprising:
an asphalt binder;
a polymer comprising two or more units of monomer A, wherein monomer A has a molecular weight of less than 500 Da;
sulfur;
a compound of formula (I):

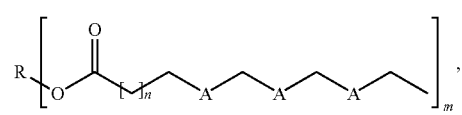

wherein:
each A is selected independently at each occurrence thereof from the group consisting of

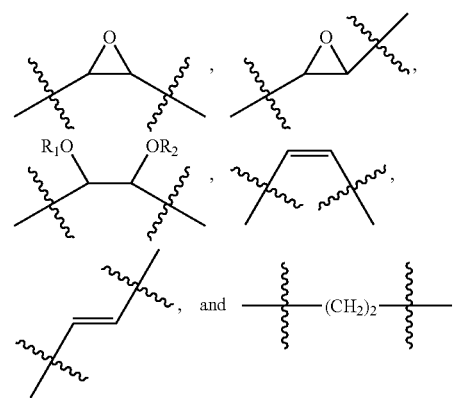

and
wherein at least one A is

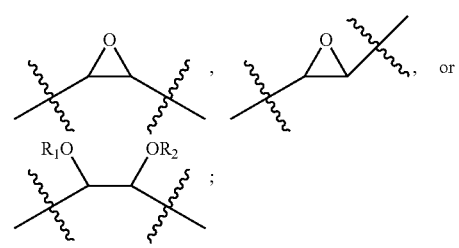

n=1-12;
m is 1, 2, or 3;
each

represents the point of attachment to a —$CH_2$— group;
R is selected from the group consisting of H, $C_1$-$C_{23}$ alkyl, and benzyl, wherein the $C_1$-$C_{23}$ alkyl can be optionally substituted with an aryl, heteroaryl, or heterocyclyl;
$R_1$ and $R_2$ are independently selected from the group consisting of H, $C_1$-$C_{23}$ alkyl and benzyl, wherein the $C_1$-$C_{23}$ alkyl can be optionally substituted with an aryl, heteroaryl, or heterocyclyl;

wherein the compound of formula (I) has a mass content of oxirane greater than 0.1 and less than 15%.

Another aspect of the present application relates to an asphalt product composition. The composition includes the asphalt binder composition as described herein and a mineral aggregate. A mineral aggregate may be added to the asphalt binder composition to modify its rheology and temperature susceptibility.

Mineral aggregate that can be used according to the present application includes sand, gravel, limestone, quartzite, granite, crushed stone, recycled asphalt pavement (RAP), recycled asphalt shingles (RAS), de-asphalting bottoms, residuum oil supercritical extraction unit bottoms (ROSE unit bottoms), and combinations thereof. The mineral aggregate particles of the present application include calcium-based aggregates, for example, limestone, siliceous based aggregates and mixtures thereof. Aggregates can be selected for asphalt paving applications based on a number of criteria, including physical properties, compatibility with the bitumen to be used in the construction process, availability, and ability to provide a finished pavement that meets the performance specifications of the pavement layer for the traffic projected over the design life of the project.

In one embodiment, the asphalt product is in the form of asphalt concrete or an asphalt mixture. The asphalt mixture may further include fiberglass and a mineral aggregate. The mineral aggregate may include lime dust and/or granular ceramic material. Mineral aggregates of the present application may include elements of less than 0.063 mm and optionally aggregates originating from recycled materials, sand with grain sizes between 0.063 mm and 2 mm and optionally grit, containing grains of a size greater than 2 mm, and optionally alumino-silicates. Aluminosilicates are inorganic compounds based on aluminium and sodium silicates or other metal such as potassium or calcium silicates. Aluminosilicates reduce the viscosity of the warm-mix and are in the form of a powder and/or granulates. The term granulates refers to mineral and/or synthetic granulates, especially coated material aggregates, which are conventionally added to bituminous binders for making mixtures of materials for road construction.

In at least one embodiment, the asphalt binder composition further includes a carbonyl additive.

Another aspect of the present application relates to a recycled asphalt pavement aggregate that includes the asphalt binder composition as described herein.

In another embodiment, the asphalt binder composition is used in roofing shingles. For a roofing-grade asphalt material, roofing granules can be applied to a surface of a coated base material. The roofing granules can be used for ultraviolet radiation protection, coloration, impact resistance, fire resistance, another suitable purpose, or any combination thereof. The roofing granules can include inert base particles that are durable, inert inorganic mineral particles, such as andesite, boehmite, coal slag, diabase, metabasalt, nephaline syenite, quartzite, rhyodacite, rhyolite, river gravel, mullite-containing granules, another suitable inert material, or any combination thereof. See U.S. Patent Publ. No. 2013/0160674 to Hong et al., which is hereby incorporated by reference in its entirety. In another embodiment, the asphalt product is used in a recycled asphalt pavement aggregate.

Roofing granules may also include one or more surface coatings over the shingle. The surface coating can cover at least approximately 75% of the surface of the shingle, and may cover at least approximately 90% of the surface of the shingle and may or may not have a uniform thickness. If more than one surface coating is used, a surface coating closer to the shingle can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic latex, polyurethane, polyester, silicone, polyamide, or any combination thereof. One or more additional organic binders of the same or different composition can be used.

A surface coating may also or alternatively include a solar reflective material that helps to reflect at least some of the solar energy. For example, UV radiation can further polymerize or harden the asphalt within roofing product being fabricated. A solar reflective material can include titanium dioxide, zinc oxide, or the like. Alternatively, the solar reflective material can include a polymeric material. In one embodiment, a polymer can include a benzene-modified polymer (e.g., copolymer including a styrene and an acrylate), a fluoropolymer, or any combination thereof. Other solar reflective materials are described in U.S. Pat. No. 7,241,500 to Shiao et al. and U.S. Publ. Nos. 2005/0072110 to Shiao et al. and 2008/0220167 to Wisniewski et al., all of which are incorporated by reference for their teachings of materials that are used to reflect radiation (e.g., UV, infrared, etc.) from the sun.

A surface coating can also or alternatively include an algaecide or another biocide to help reduce or delay the formation of algae or another organic growth. The algaecide or other biocide can include an organic or inorganic material. The algaecide or other biocide can include a triazine, a carbamate, an amide, an alcohol, a glycol, a thiazolin, a sulfate, a chloride, copper, a copper compound, zinc, a zinc compound, another suitable biocide, or any combination thereof. In a particular embodiment, the algaecide or other biocide can be included within a polymeric binder. The polymeric binder can include polyethylene, another polyolefin, an acid-containing polyolefin, ethylene vinyl acetate, an ethylene-alkyl acrylate copolymer, a polyvinylbutyral, polyamide, a fluoropolymer, an acrylic, a methacrylate, an acrylate, polyurethane, another suitable binder material, or any combination thereof. The algaecide or other biocide can be an inorganic material that is included within an inorganic binder, for example, within an alkali metal silicate binder. An exemplary inorganic algaecide or other biocide can include a metal (by itself), a metal oxide, a metal salt, or any combination thereof. The metallic element used within the metal, metal oxide, or salt may include copper, zinc, silver, or the like. The metal salt can include a metal sulfate, a metal phosphate, or the like.

A surface coating can include a colorant or another material to provide a desired optical effect. The colorant or other material can include a metal oxide compound, such as titanium dioxide (white), zinc ferrite (yellow), red iron oxides, chrome oxide (green), and ultramarine (blue), silver oxide (black), zinc oxide (dark green), or the like. In another embodiment, the colorant or other material may not be a metal-oxide compound. For example, the colorant may include carbon black, zinc or aluminum flake, or a metal nitride.

The asphalt containing the product may be mixed with fiberglass and mineral aggregate typically composed of lime dust and/or granular ceramic material, such as manufactured ceramic material to form roofing shingles. The shingles can also include manufactured sand, e.g., crushed and washed mined aggregate, and also a blend of ceramic material and manufactured sand. The roofing shingles can also include modified asphalt containing a Fischer-Tropsch wax, polyethylene wax, and/or oxidized polyethylene wax. Wax modifiers that can be usefully employed in the context of the present application include, but are not limited to, waxes of vegetable (e.g. carnuba wax), animal (e.g beeswax) mineral (e.g. Montan™ wax from coal, Fischer Tropsch wax from coal) or petroleum (e.g. paraffin wax, polyethylene wax, Fischer-Tropsch wax from gas) origin including oxidized waxes; amide waxes (e.g. ethylene bis stearamide, stearyl amide, stearyl stearamide); fatty acids and soaps of waxy nature (e.g., aluminum stearate, calcium stearate, fatty acids); other fatty materials of waxy nature (fatty alcohols, hydrogenated fats, fatty esters etc) with the ability to stiffen asphalt, and the like. The above products are basically soluble in the asphalt at warm mix temperatures, to make a homogeneous binder, and/or will melt at the temperature of the mix and the ingredients will disperse/dissolve into the mixture. The wax and resin ingredients will generally act to improve cohesion properties of the asphalt, while the adhesion promoter will improve the adhesion of the asphalt to the aggregate. Together the ingredients provide improved resistance to water damage. The present application may employ a Fischer Tropsch Wax derived from coal or natural gas or any petroleum feedstock. The process entails the gasification of the above feedstock by partial oxidation to produce carbon monoxide under high temperature and pressure and reaction of the resultant carbon monoxide with hydrogen under high temperature and pressure in the presence of a suitable catalyst (such as iron compound or cobalt compound) for example as in the case of processes employed by Shell and Sasol. The congealing point of the wax is between 68° C. and 120° C. with a Brookfield viscosity at 135° C. in the range of 8 to 20 cPs. For example, the congealing point of the wax may be between 80° C. and 120° C. Alternatively, the congealing point of the wax may be between 68° C. and 105° C. See U.S. Patent Publ. No. 2013/0186302 to Naidoo et al., which is hereby incorporated by reference in its entirety.

Another aspect of the present application relates to a method of forming a pavement. The method includes (a) providing the asphalt binder composition as described herein; (b) mixing the composition with a mineral aggregate to form a mixture; (c) applying the mixture to a surface to be paved to form an applied paving material, and (d) compacting the applied paving material to form the pavement.

The asphalt binder and compound of formula (I) of this aspect of the present application are in accordance with the previously described aspects. In one embodiment, the asphalt used in carrying out this aspect of the present application may be the above described polymer modified asphalt.

The above disclosure is general. A more specific description is provided below in the following examples. The examples are described solely for the purpose of illustration and are not intended to limit the scope of the present application. Changes in form and substitution of equivalents are contemplated as circumstances suggest or render expedient. Although specific terms have been employed herein, such terms are intended in a descriptive sense and not for purposes of limitation.

EXAMPLES

Example 1—Materials

Vacuum distillation tower bottoms with a PG grade of 76-10 obtained from an Illinois refinery were used. Recycled asphalt pavement (RAP) used in solvency testing was sourced from Des Moines Asphalt, Inc. stockpile #ABC12-0021 in Johnston, Iowa. RAP binder was passed over a No. 4 sieve to create a fine RAP, which contained 5.75% asphalt binder by weight. A sample of RAP binder was then extracted using toluene and determined to have a continuous PG grade of 85.5-21.3 (PG 88-16). The SBS polymer used in the asphalt modification was a Radial SBS LG 0411. Rejuvenators used were Epoxidized Methyl Soyate (EMS), Sub-Epoxidized Soybean Oil containing 1.5%, 2.5%, and 4.0% oxirane (mass content), and Hydrolene 600T. Elemental Sulfur was used as a crosslinking agent for Radial SBS LG 0411. Solvents like toluene, tetrahydrofuran (TIE), and heptanes were obtained from Sigma Aldrich and used without further purification. Materials Used in Binder Modification Testing are shown in Table 1.

TABLE 1

Binder Code for Materials Used in Binder Modification Testing

| Binder code | % Sulfur | Rejuvenators | % Rejuvenator | % Radial SBS |
|---|---|---|---|---|
| V | | | 0 | 0 |
| V P | | | 0 | 2 |
| V P * | 0.2 | | 0 | 2 |
| V E 5 | | EMS | 5 | 0 |
| V E 6 | | | 6 | 0 |
| V E 10 | | | 10 | 0 |
| V E 6 P | | | 6 | 2 |
| V E 6 P * | 0.2 | | 6 | 2 |
| V $S_{4.0}$5 | | SESO 4.0 | 5 | 0 |
| V $S_{4.0}$10 | | | 10 | 0 |
| V $S_{4.0}$6 P | | | 6 | 2 |
| V $S_{4.0}$6 P * | 0.2 | | 6 | 2 |
| V $S_{2.5}$5 | | SESO 2.5 | 5 | 0 |
| V $S_{2.5}$10 | | | 10 | 0 |
| V $S_{2.5}$6 P | | | 6 | 2 |
| V $S_{2.5}$6 P * | 0.2 | | 6 | 2 |
| V $S_{1.5}$5 | | SESO 1.5 | 5 | 0 |
| V $S_{1.5}$10 | | | 10 | 0 |
| V $S_{1.5}$6 P | | | 6 | 2 |
| V $S_{1.5}$6 P * | 0.2 | | 6 | 2 |
| V $H_{600r}$5 | | Hydrolene 600T | 5 | 0 |
| V $H_{600r}$6 P | | | 6 | 2 |
| V $H_{600r}$6 P * | 0.2 | | 6 | 2 |
| V $H_{600r}$6 E 6 P * | 0.2 | Hydrolene 600T & EMS | 6 | 2 |
| R E 5.92 | | EMS | 5.92 | 0 |
| R $S_{2.5}$5.92 | | SESO 1.5 | 5.92 | 0 |
| R J 5.92 | | JIVE | 5.92 | 0 |
| X E 2.75 | | EMS | 2.75 | 0 |
| X $S_{1.5}$2.75 | | SESO 1.5 | 2.75 | 0 |
| X J 2.75 | | JIVE | 2.75 | 0 |

X Asphalt binder w/ PG (52-34)
R Recycled Asphalt Pavement
V Vacuum Tower Bottom
* 0.2% Sulfur
E Epoxy Methyl Soyate
$S_{4.0}$ 4.0 epoxy mass % of SESO
$S_{2.5}$ 2.5 epoxy mass % of SESO
$S_{1.5}$ 1.5 epoxy mass % of SESO
J Jive - Soybean Oil Rejuvenator
P 2.0% Radial SBS
$H_{600r}$ Hydrolene 600T

Example 2—Asphalt Blend Preparation

Blends were prepared in aluminum quart cans with 350.0 g of VTB binder and were heated to 140.0° C. and mixed at 2000 RPM for 10.0 minutes using a Silverson Shear Mill. 2% by binder weight of SBS polymer was then added to the VTB over the course of 10.0 minutes. The VTB and SBS were allowed to blend for 10 minutes, the mixing speed was then increased to 5000 RPM and allowed to blend for an additional 20 minutes. The temperature was then adjusted to 180.0° C. and the mixing speed was decreased to 2000 RPM, sulfur (if required) was added at 0.2% by binder weight, and the blend was allowed to mix for an additional 2 hours. The sample was then removed and allowed to cool. SBS-modified-VTBs samples were heated up to 140.0° C. and mechanically agitated using an IKA W20 mixer at a speed of 150.0 RPM. EMS, SESO, or Hydrolene were then added at 6.0% by binder weight, and the temperature was raised to 150.0° C. and allowed to blend for an additional 15.0 hours. The RPM chosen were selected to eliminate any oxidative effects.

Example 3—Solvency Testing

Solvency testing was done by first mixing 250 g of the fine RAP with 400 mL of the desired solvent. The sample was mechanically agitated using an IKA W20 mixer equipped with a round bottom paddle impeller at a speed of 400 RPM. The aliquots (5 mL) were taken at different time intervals up to 48 hours (5, 20, 120, 360, 1440, and 2880 minutes). The aliquots were then allowed to settle, diluted (2 fold dilution of 100 uL solvated asphalt into 3 mL of THF), and analyzed using a Shimadzu UV-Vis/NIR instrument scanning from 400-200 nm. The value of the peak at the 3 different wavelengths were used as the measurement for the solvency efficacy.

Example 4—Dynamic Shear Rheometer Testing

Dynamic shear rheometer (DSR) tests were conducted on unaged (original), and short-term aged binder specimens at high temperatures, and long-term aged asphalt binder specimens at intermediate temperatures. The DSR measured a specimen's complex shear modulus (G*) and phase angle (δ). The complex shear modulus (G*) was a specimen's total resistance to deformation, and the phase angle (δ) was the lag between the applied shear stress and the resulting shear strain. For unaged (original) and short-term aged binder, rutting was the main concern; while for long-term aged binder, fatigue cracking was the main concern. Critical high temperature for unaged and short-term aged binder was determined when G*/Sin(δ) was equal to 1.0 kPa and 2.2 kPa, while intermediate critical fatigue temperature was determined when G* sin δ was equal to 5000 kPa.

Specimens used in the determination of the critical high temperature and critical intermediate fatigue temperatures were 25 mm and 8 mm in diameter with a thickness of 1 mm and 2 mm. Specimens were conditioned for 10 minutes at each test temperature after which 10 cycles of testing were done at a frequency of 1.59 Hz to determine the average G* and δ. For unaged, short-term aged and long-term aged specimens, testing was strain controlled and was held at 12%, 10%, and 1%, respectively. For unaged, and short-term aged specimens testing took place at temperatures with an interval of 6° C., ranging between 46° C. up to 106° C. However, to determine the critical high temperature of a binder testing only needed to take place at two temperatures, one below and one above the critical high temperature. For long-term aged binder specimens testing took place at temperatures with an interval of 3° C. from 40° C. to 4° C.

Example 5—Mass Loss Testing

The Rolling Thin-Film Oven (RTFO) provided a means to simulate the aging that binders experience during construction (short-term aging). Within this test, asphalt binder was exposed to air at a temperature of 163° C. for 85 minutes. The RTFO also provided a means of measuring how much asphalt binder was lost due to oxidation during the test. The requirement to pass the RTFO mass loss test was achieved by having a mass loss of 1% or less. When looking at rejuvenator technologies this was very important because materials were being added to RAP binders that were very stiff due to being very aged. This meant that RAP binders may have decreased adhesion and cohesion properties. It was important to find the right dosage of material as extra material could be lost during short-term aging.

Example 6—Cigar Tube Testing

The storage stability test was performed following ASTM D7173-14 to determine the separation tendency of polymer modified asphalt binder. The test is commonly known as the cigar tube test (CTB) as an aluminum tube (25 mm diameter and 140 mm height) is used to hold the material during storage. In this application, the tubes were filled with 50±0.5 g of SBS modified asphalt binders (with SESO, EMS and no bio additive) and sealed. The tubes were stored vertically in an oven at 163±5° C. for 48 hours and were transferred to a freezer set at a temperature of −10±10° C. for a minimum of 4 hours until the material solidified thoroughly. Each tube with the solidified binder was cut into three portions of equal length. The center section was discarded, while the top and bottom portions were saved for rheological testing. The complex shear modulus (G*) and phase angle (δ) of the material from the top and bottom portions were obtained by DSR test using a 25 mm diameter parallel plate with a 1 mm gap at a test temperature of 60° C. through a frequency sweep test (1.0 to 100 rad/s) at 5% shear strain. The separation index (Is) of G* and δ were calculated by using the logarithm of the ratio between G* of the top and the bottom and δ of the top and bottom at the test temperature of 60° C. and test frequency of 10 rad/s (Pamplona et al., "Asphalt Binders Modified by SBS and SBS/Nanoclays: Effect on Rheological Properties," *J. Braz. Chem. Soc.* 23:639-647 (2012); Youtcheff et al., "Evaluation of the Laboratory Asphalt Stability Test," (Final—July 2003 No. FHWA-HRT-04-111). U. S. Department of Transportation, Federal Highway Administration (2005), which are hereby incorporated by reference in their entirety). The storage stability of the material was evaluated by how close the Is value was to zero. The binder with an Is value closer to zero indicated there was less potential for the binder to have separation (Pamplona et al., "Asphalt Binders Modified by SBS and SBS/Nanoclays: Effect on Rheological Properties," J. Braz. Chem. Soc. 23:639-647 (2012); Youtcheff et al., "Evaluation of the Laboratory Asphalt Stability Test," (Final—July 2003 No. FHWA-HRT-04-111). U. S. Department of Transportation, Federal Highway Administration (2005), which are hereby incorporated by reference in their entirety). The percent separation was determined by using the G*/sin δ value at 10 rad/s following Eq. (1) below (Kim et al., "Laboratory Investigation of Different Standards of Phase Separation in Crumb Rubber Modified Asphalt Binders," *J. Mater. Civ. Eng.* 25:1975-1978 (2013), which is hereby incorporated by reference in its entirety):

$$\% \text{ Separation} = \frac{\left(\frac{G^*}{\sin\delta}\right)_{max} - \left(\frac{G^*}{\sin\delta}\right)_{avg}}{\left(\frac{G^*}{\sin\delta}\right)_{avg}} \times 100 \tag{1}$$

where $$\left(\frac{G^*}{\sin\delta}\right)_{max}$$

is the higher value between the top and bottom tube portions and $$\left(\frac{G^*}{\sin\delta}\right)_{avg}$$

is the average value of the two portions.

Example 7—Multiple Stress Creep Recovery Testing

The multiple stress creep recovery (MSCR) test used 25 mm parallel plate geometry with a 1 mm gap with DSR equipment. Generally, the test was performed at the high temperature of the RTFO-aged unmodified binder's performance grade. For this experiment, the VTB binder was tested at 58° C. and 64° C. due to effect of SESO and EMS on the critical high temperature of the neat binder. Even though it was stated in the MSCR test procedure that testing must take place at the PG high temperature, this was not the case for polymer modified binders. Polymer modified binders must be tested at the neat binder's PG high temperature to achieve what the MSCR procedure considers grade bumping for the location's environmental temperature (AASHTO, M 332-"Performance-Graded Asphalt Binder Using Multiple Stress Creep Recovery (MSCR) Test," AASHTO M 332-14. *American Association of State Highway and Transportation Officials*, Washington, D.C. (2014), which is hereby incorporated by reference in its entirety). Testing took place at two creep stress levels, 0.1 kPa and 3.2 kPa. There were thirty cycles in a test; each cycle was ten seconds long, where a constant creep stress was applied during the first second of a cycle and was followed by a nine second period recovery. The pressure applied during the first twenty cycles was 0.1 kPa, followed by ten cycles at 3.2 kPa. The first ten cycles of the thirty cycles were for conditioning and were not used in calculating the final results. The parameters of interest included the non-recoverable creep compliance, $J_{nr}$, and the percentage of recovery (R) at the two creep stress of 0.1 kPa, and 3.2 kPa according to the standards American Society for Testing and Materials (ASTM) D7405-15 and AASHTO T 350-14 as well as the percent difference between average $J_{nr}$ values from each creep stress level (AASHTO, T 350-"Multiple Stress Creep Recovery (MSCR) Test of Asphalt Binder Using a Dynamic Shear Rheometer (DSR)," AASHTO T 350-14. *American Association of State Highway and Transportation Officials*, Washington, D C (2014); D04 Committee, n.d. "Test Method for Multiple Stress Creep and Recovery (MSCR) of Asphalt Binder Using a Dynamic Shear Rheometer," *ASTM International*; D04 Committee, n.d. Test Method for Separation of Asphalt into Four Fractions," *ASTM International*, which are hereby incorporated by reference in their entirety). The MSCR test uses the following equations to determine R, $J_{nr}$, and $J_{nr\,diff}$.

$$\% \text{ Recovery}(R) \text{ of each cycle} = \left(\frac{\text{Peak Strain} - \text{Unrecovered Strain}}{\text{Peak Strain}}\right) * 100\% \quad (2)$$

$$\% \text{ Average Recovery}(R) \text{ for each creep stress level} = \frac{\sum_{1}^{10}(R(i))}{10} \quad (3)$$

$$J_{nr} \text{ of each cycle} = \left(\frac{\text{Unrecovered Strain}}{\text{Applied Stress}}\right) \quad (4)$$

$$\text{Average } J_{nr} \text{ for each creep stress level} = \frac{\sum_{1}^{10}(J_{nr}(i))}{10} \quad (5)$$

$$\% J_{nrdiff} = \left(\frac{AveJ_{nr3.2\,kPa} - AveJ_{nr0.1\,kPa}}{AveJ_{nr0.1\,kPa}}\right) * 100\% \quad (6)$$

The main parameters of interest used for determining the traffic volume classification of the polymer modified binder are percentage of recovery at 3.2 kPa and $J_{nr\,dir}$.

Example 8—Bending Beam Rheometer Testing

The Bending Beam Rheometer (BBR) test method was used to measure low temperature properties from long-term aged asphalt binder such as stiffness and relaxation. Stiffness and relaxation measurements were used as indicators of an asphalt binder's ability to resist low temperature cracking. These results were used in the determination of an asphalt binder's low temperature performance grade (PG) grade. For this test a small asphalt beam was immersed in a cold liquid bath and was simply supported, whereupon after an hour of conditioning at the test temperature a load was applied to the center of the beam and the deflection measurements against time were obtained. Stiffness was calculated based on measured deflection and the standard beam dimensions used. The m-value was a measure of how the asphalt binder relaxed the load induced stresses. Both stiffness and m-value recorded at 60 seconds were used for determining the critical low temperature. The critical low temperature was determined to be what is the higher of two results at which the m-value was equal to 0.3, and/or the stiffness was equal 300 MPa minus 10° C. This was used to give the low temperature PG.

Example 9—Saturates, Aromatics, Resins, and Asphaltenes (SARA) Fractionation Before small angle x-ray scattering (SAXS) can be done with asphalt binders, binders need to be fractionated into separate components (Lesueur, D., "The Colloidal Structure of Bitumen: Consequences on the Rheology and on the Mechanisms of Bitumen Modification," Advances in Colloid and Interface Science 145(1):42-82 (2009); ASTM International, ASTM D4124-09 "Standard Test Method for Separation of Asphalt into Four Fractions," West Conshohocken, Pa.; ASTM International (2018), which are hereby incorporated by reference in their entirety). These components are called saturates, non-polar aromatics, resins, and asphaltenes. Asphaltenes are the only component that can be examined in SAXS. Asphaltenes are defined by their insolubility in heptane, meaning they can be separated from asphalt using a filter. The three fractions different from asphaltenes when together are called maltenes or petrolenes after removing the asphaltenes. For the purpose of this application the main concern was separating the asphaltenes and maltenes to examine the effect that EMS has on the proportion of asphaltenes in neat and RAP binder.

Example 10—Small X-Ray Scattering

To examine the effects of epoxidized methyl soyate on a neat binder as well as a RAP binder small angle x-ray scattering (SAXS) was used to evaluate if changes occurred to the asphaltenes collected through SARA fractionation. For this application a 6.5 meter sample to detector SAXS system (Xenocs Xeuss 2.0 SAXS) was used. Calibration of the equipment was done with a copper source using Silver behenate. Subsequently, five minutes of exposure were used on control specimens and specimens with EMS. Results were reduced from 2D to 1D and normalized for analysis. For final analysis, the main parameter of interest was the average asphaltene's radius of gyration.

Example 11—Fluorescence Microscopy

Glass film specimens were prepared by pouring a drop of heated modified asphalt binder onto a glass plate and adding the coverslip to protect the sample (Handle et al., "The Bitumen Microstructure: A Fluorescent Approach," *Mater. Struct.* 49:167-180 (2016); Grossegger et al., "Fluorescence Spectroscopic Investigation of Bitumen Aged by Field Exposure Respectively Modified Rolling Thin Film Oven Test," *Road Mater. Pavement Des.* 19:992-1000 (2018), which are hereby incorporated by reference in their entirety). Samples were then annealed in an oven for 15 min at 150° C. to get rid of air bubbles and spread the material (Valverde et al., "Conjugated Low-Saturation Soybean Oil Thermosets: Free-Radical Copolymerization with Dicyclopentadiene and Divinylbenzene," *J. Appl. Polym. Sci.* 107:423-430 (2008), which is hereby incorporated by reference in its entirety). A Leica DM4000 B LED fluorescence optical microscope equipped with a Leica DFC7000-T digital camera was used to observe the morphology of the polymer modified binders (FIG. 1).

Example 12—Results and Discussion

Solvency Kinetics

Figure 2:
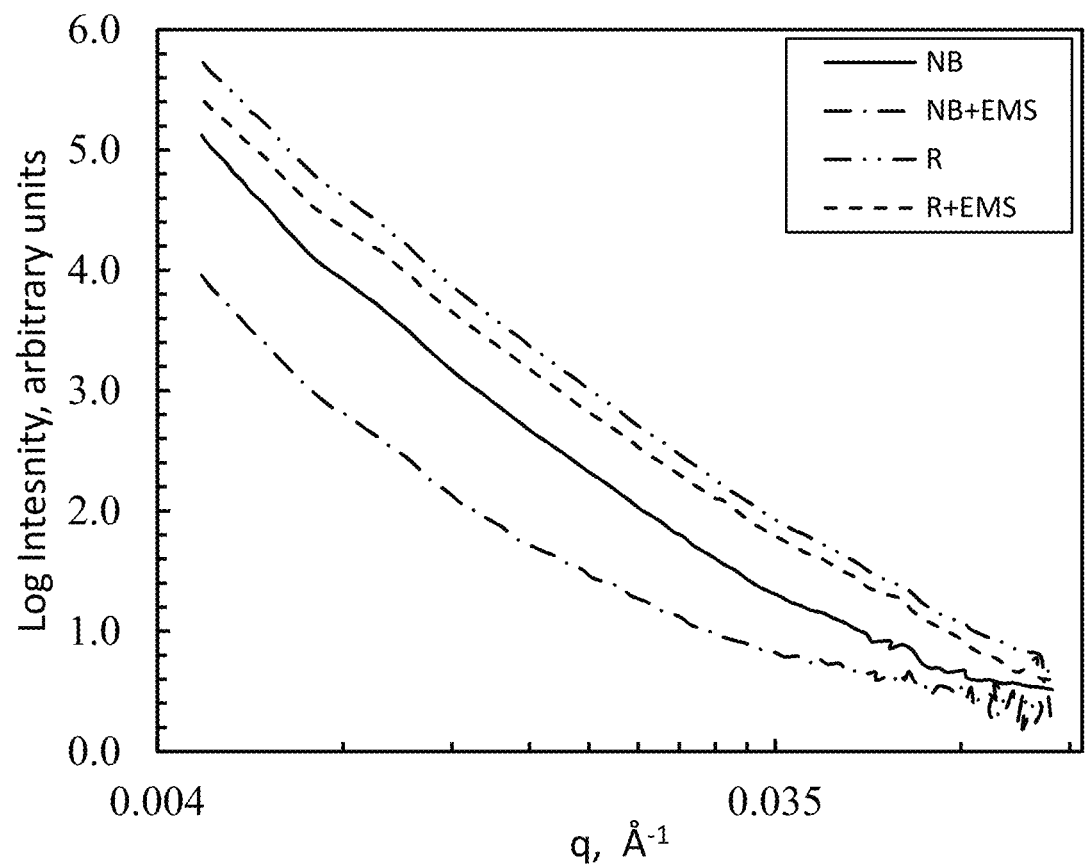
FIG. 2 is a graph showing comparison of recycled asphalt pavement (RAP) solvency performance of various asphalt fluxes and rejuvenators using the area of the UV absorbance from wavelengths 215 nm-400 nm, normalized to the highest THF absorbance.

To prove the efficacy of the biobased additive to solvate RAP, UV absorbance was measured at various wavelengths. Additives that rejuvenate aged binder should rapidly solvate the oxidized asphaltenes in RAP binder, and accordingly will achieve the highest UV absorbance from the solvated aromatic content. Four materials were tested as the solvating rejuvenator: tetrahydrofuran (control), SESO, corn oil, and EMS. THE was selected as a control solvent owing to its ability to most rapidly and completely solvate RAP binder compared to any other known rejuvenator materials. FIG. 2 and Table 2 show normalized UV absorbance areas from the wavelengths 215-400 nm, with tetrahydrofuran (THF) being the normalized baseline. EMS had the largest UV absorbance from all of the materials and, thus, the highest solvency of RAP. The absorbance of all of the materials tested, except SESO, leveled off around 1500 minutes. SESO, however, at early times, had a reduced absorbance compared to the other fluxes and rejuvenators, but as time continued, the UV absorbance area increased implying a delay is the asphaltene solvation. This delay could be due to SESO's bulky structure hindering it's asphaltene diffusion.

TABLE 2

Comparison of RAP Solvency Performance of Various Asphalt Fluxes and Rejuvenators Using the Area of the UV From Wavelengths 215 nm-400 nm (area was normalized to the highest THF absorbance)

| Time | EMS Absorbance | SESO Absorbance | THF Absorbance | Corn oil Absorbance |
|---|---|---|---|---|
| 5 | 0.22 | 0.18 | 0.73 | 0.33 |
| 20 | 0.46 | 0.43 | 0.78 | 0.37 |
| 120 | 0.54 | 0.47 | 0.76 | 0.53 |
| 360 | 0.67 | 0.47 | 0.79 | 0.66 |
| 1440 | 0.75 | 0.53 | 1 | 0.68 |
| 2880 | 0.75 | 0.68 | 0.92 | 0.71 |

Figure 3:
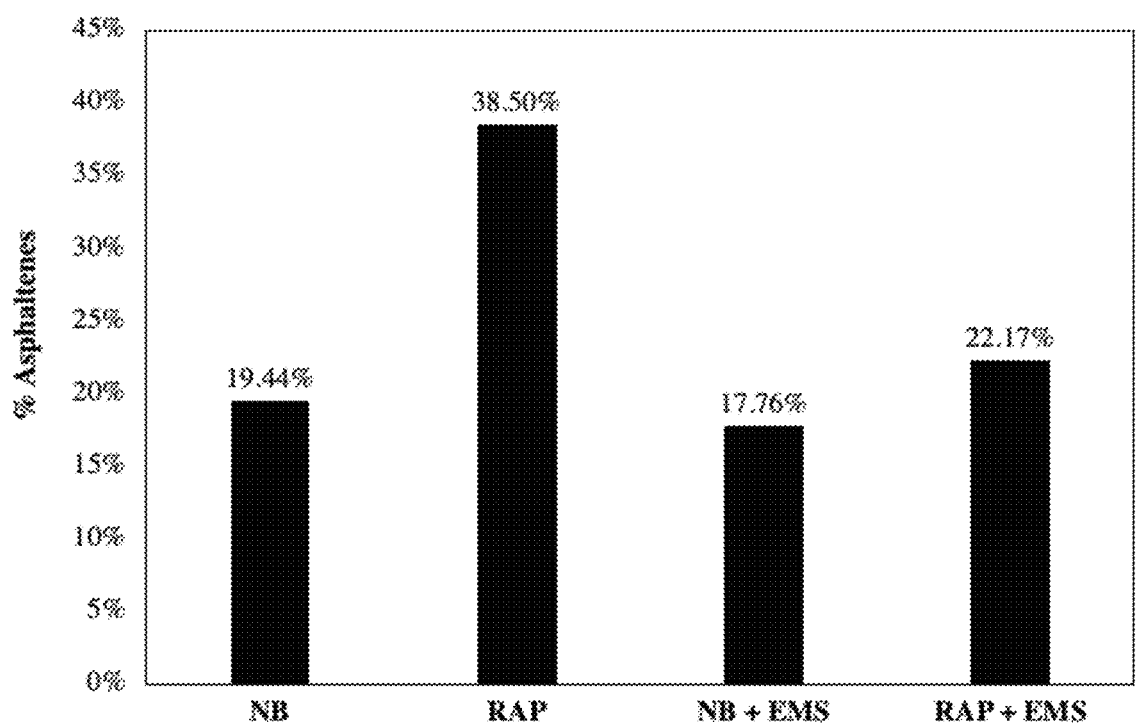
FIG. 3 is a graph showing percentage of asphaltenes for the following four groups; neat binder—NB (PG 52-34), NB+2.75% EMS by weight of NB, RAP, and RAP+5.92% EMS by weight of the RAP binder.

The asphaltenes of the different binders were separated and the corresponding fractions are shown in FIG. 3. After separation, the asphaltenes were removed from the filter and were dried into a fine powder. The asphaltene powder from each of the four groups was then prepared as specimens for testing in the SAXS.

Figure 4:
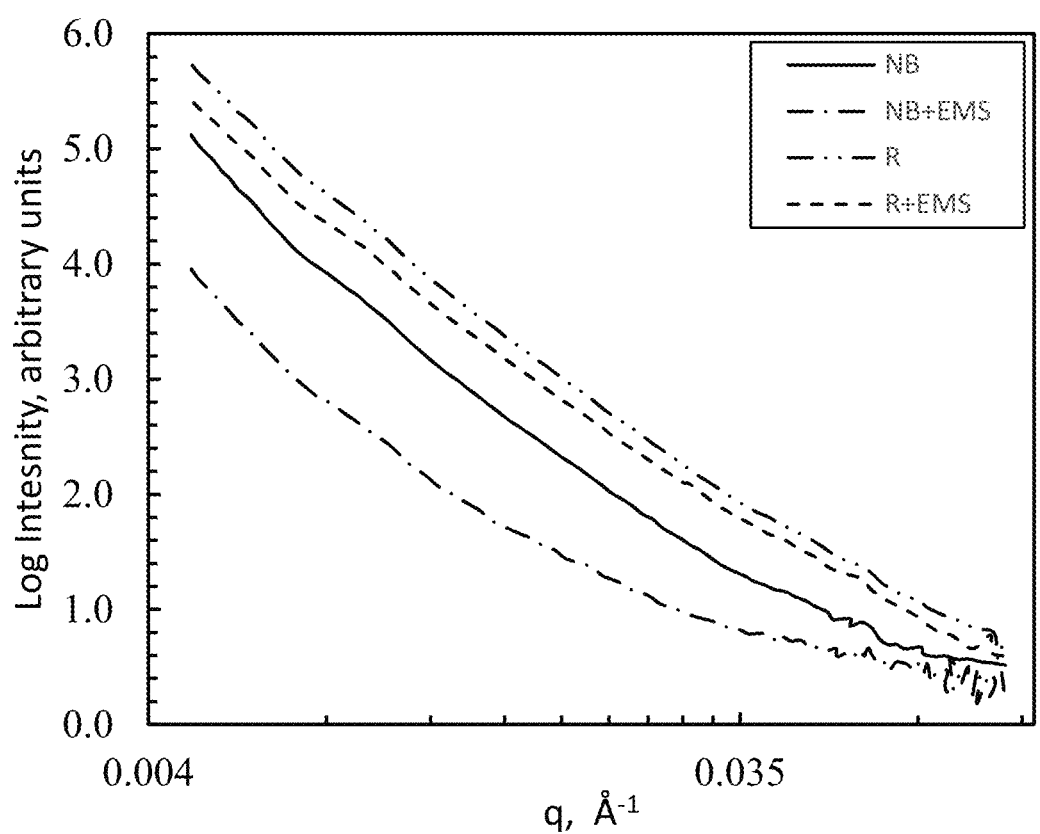
FIG. 4 is a graph showing SAXS results of Neat Binder and RAP Binder asphaltenes modified with and without EMS.

SAXS is a nondestructive technique used to determine the size distribution of nanoscale sized molecules, calculate order-disorder transitions temperatures, resolve the size and shape of monodisperse macromolecules, etc. In terms of asphaltenes, SAXS is primarily used to give a topological view of the aggregate systems in which the X-rays are scattered by the electron density differences between the aggregate and the medium (Tanaka et al., "Characterization of Asphaltene Aggregates Using X-ray Diffraction and Small-Angle X-ray Scattering," *Energy & Fuels* 18(4):118-1125 (2004); Storm et al., "Macrostructure of Asphaltenes in Vacuum Residue by Small-Angle X-Ray Scattering," *Fuel* 72(7):977-981 (1993); Xu et al., "Characterization of Athabasca Asphaltenes by Small-Angle X-Ray Scattering," *Fuel* 74(7):960-964 (1995); Savvidis et al., "Aggregated Structure of Flocculated Asphaltenes," *AIChE Journal* 47(1):206-211 (2001); Jestin et al., "Application of NMR Solvent Relaxation and SAXS to Asphaltenes Solutions Characterization," *Journal of Dispersion Science and Technology* 25(3):341-347 (2004), which are hereby incorporated by reference in their entirety). In this application, SAXS was used on the asphaltene fractions from polymer modified asphalt and to examine the effects of solvents on the dissociation of asphaltenes. FIG. 4 shows the specimens that have been tested.

To analyze the reduced normalized SAXS results and examine the effect of EMS on the neat binder's and RAP binder's asphaltenes the radius of gyration must be estimated using a Guinier plot of the reduced normalized results. A Guinier plot is a plot visual that is helpful in the analysis of SAXS data curves at very small angles. It allows for the determination of two parameters; the radius-of-gyration, and the extrapolated intensity when the angle would be equal to zero. The plot was developed by plotting the reduced normalized SAXS data in terms of y-axis (natural log of intensity) against x-axis (scattering vector to the second power). The radius-of-gyration was determined using the slope of the data curve. The asphaltene particles were assumed to be spherical in shape. In terms of spherical particles, the following equations were used to determine the radius-of-gyration based on the slope:

$$R_g = \text{SQRT}(\text{Slope}(\text{GuinierPlot})*3) \quad (7)$$

$$R = \text{SQRT}((5/3)*R_g^2) \quad (8)$$

Figure 5:
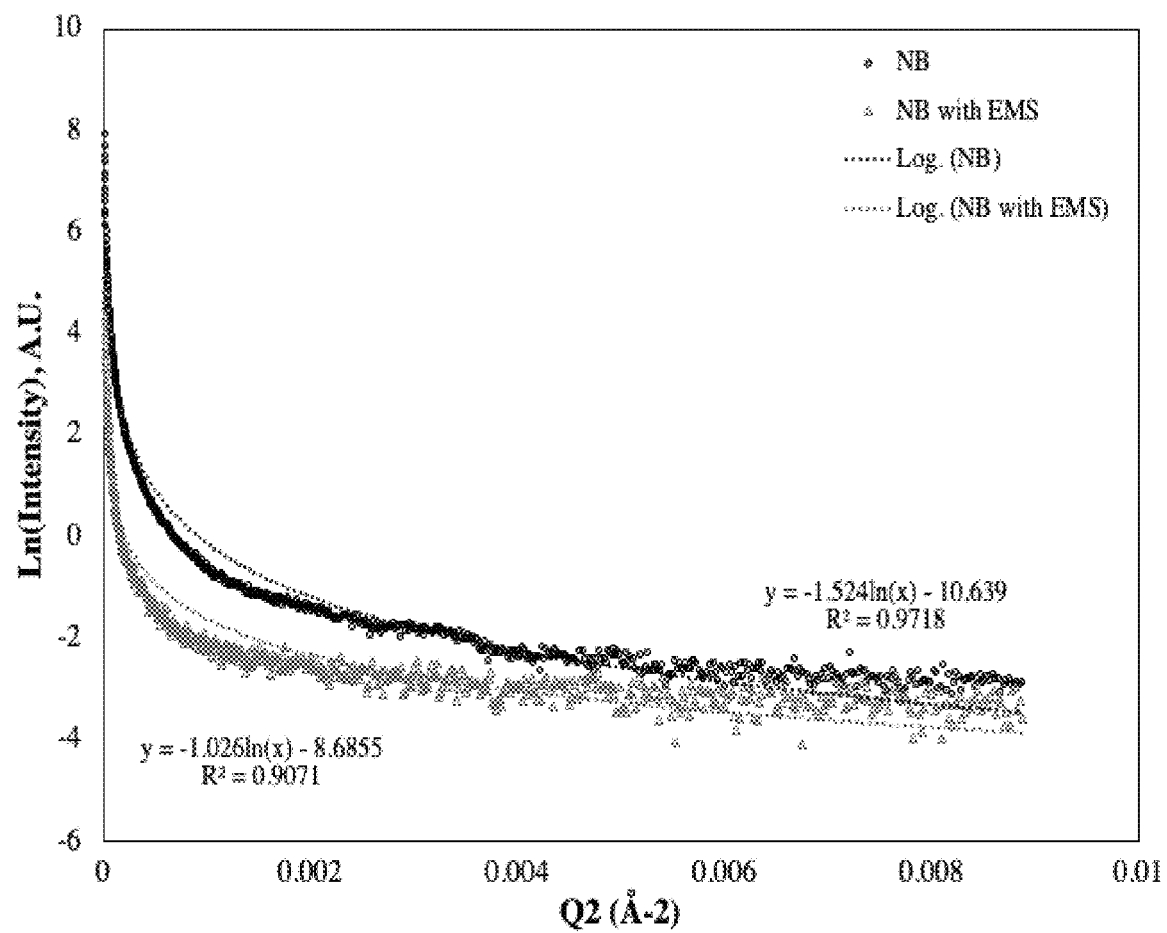
FIG. 5 is a graph showing a Guinier plot results of Neat Binder modified with and without EMS.
Figure 6:
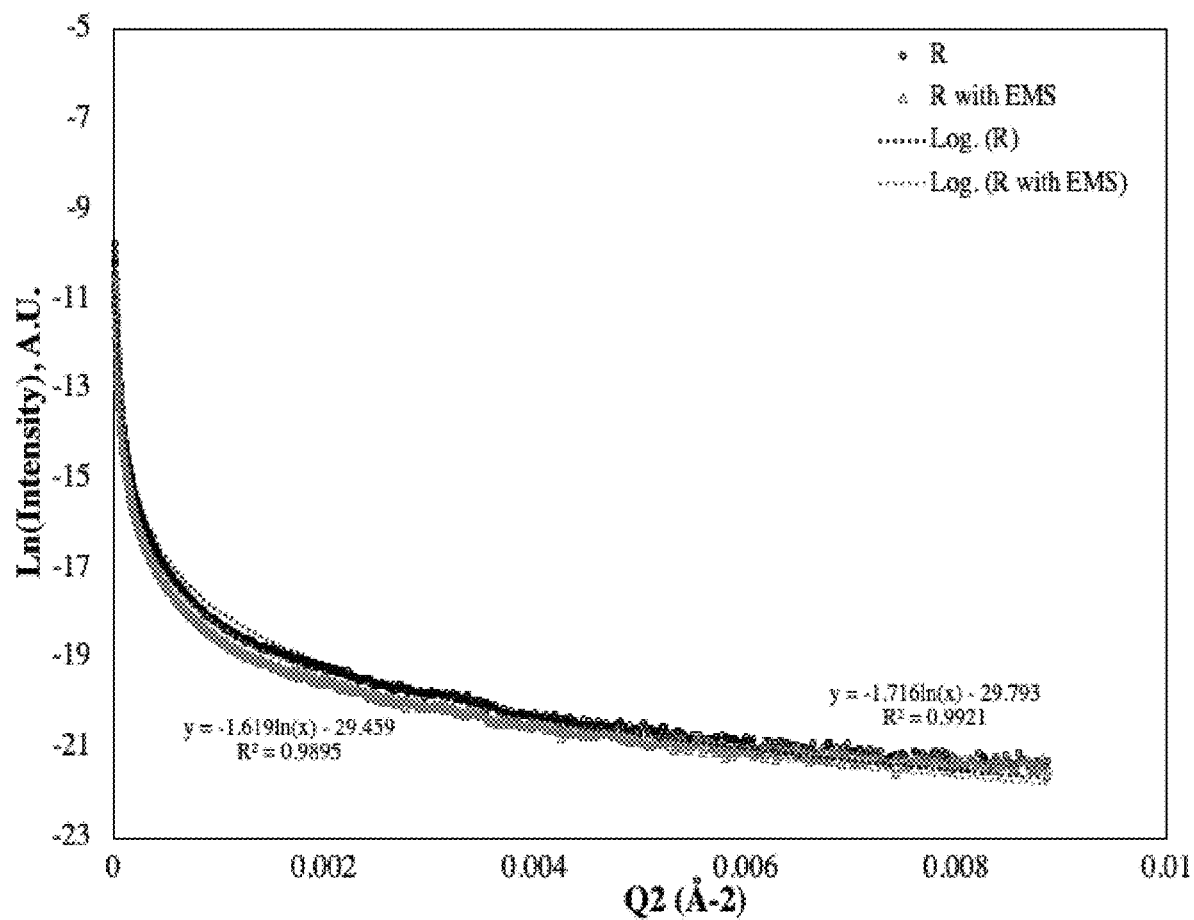
FIG. 6 is a graph showing a Guinier plot results of RAP Binder modified with and without EMS.

The Guinier Plots for the neat binder with and without EMS and the RAP binder with and without EMS are shown in FIGS. 5 and 6. Based on the resulting slope values shown by fitting, the radius-of-gyration values for the four groups (NB, NB+EMS, RAP, and RAP+EMS) were 2.76 Å, 2.27 Å, 2.93 Å, and 2.85 Å. Based on these results, when 2.75% EMS by weight of the binder was added to the neat binder (NB), the preceding asphaltene's radius-of-gyration decreased by approximately 18%, whereas when 5.92% EMS by weight of the binder was added to the RAP binder the preceding asphaltene's radius-of-gyration decreased by approximately 3%. The first decrease was rather substantial while the second decrease was fairly small. However, both show that EMS was affecting the asphaltenes morphology with the two binders in terms of improved dispersion and solvation.

Fluorescence Microscopy

Interactions between the polymer and asphalt phase are essential for effectively modifying aged and low-quality asphalts with polymer. Polymer interactions in aged or LQAs are heavily dependent on the composition of saturates, aromatics, resins, and asphaltenes (SARA) (Airey, G. D., "Rheological Properties of Styrene Butadiene Styrene Polymer Modified Road Bitumens," Fuel 82:1709-1719 (2003), which is hereby incorporated by reference in its entirety). Saturates and aromatics composition are essential for preventing phase separation in order to maximize the SBS polymer structure in asphalt (Lu et al., "Phase Separation of SBS Polymer Modified Bitumens," J. Mater. Civ. Eng. 11(1):51-57 (1999), which is hereby incorporated by reference in its entirety). The role that the rejuvenators and polymer play is crucial for developing successful PMA and HMA design. The relationship between the rejuvenator, polymer, and asphalt will directly affect the structure and the corresponding mechanical properties of the polymer-modified binder modified with said rejuvenator. Fluorescence microscopy is a method used to show how sulfur and rejuvenators affect polymer morphology in asphalt. The morphology of polymers in PMA is signified by the fluorescing polymer phase (represented by the white phase). The distribution of polymer particles and particle size will correlate to the homogeneity and mechanical properties that PMA experiences (Airey, G. D., "Rheological Properties of Styrene Butadiene Styrene Polymer Modified Road Bitumens," Fuel 82:1709-1719 (2003), which is hereby incorporated by reference in its entirety). Larger particle size and heterogeneous distribution of the polymer particles suggests that there is phase separation thus leading to a decline in mechanical properties. This decline in homogeneity of polymers with asphalt is linked to the composition and arrangement of the saturates and aromatics, which is typical in VTBs.

FIGS. 7A-D show the original images (converted to black and white) of 2.0 wt. % of SBS modified VTB with sulfur and SESO. It is important to note that these images have a scale bar of 50 μm and were taken at a magnification of ×400. The fluorescence microscope images have a quantitative analysis summarized in Table 3 showing the number of particles per μm$^2$, average particle size (μm$^2$), and average feret diameter (μm). The images show that SBS blends with 411 have a large disparity in particle size within VTBs due to the saturate and aromatic composition. The presence of 6.0 wt. % SESO in SBS modified VTB's showed a decrease in particle size and distribution. This particle redistribution implied that SESO was solvating the SBS further and/or providing a better rearrangement of SARA components. Better dispersion in asphalt significantly reduced phase separation and allowed the polymer to fully interact in asphalt. The addition of 0.2 wt % sulfur without rejuvenator showed visual differences with larger particle size and a more heterogeneous distribution of the polymer phase. This particle size and distribution was due to the absence of rejuvenators like SESO that solvate and disperse the SBS. Sulfur activation with alkene groups is called vulcanization. Vulcanization occurs when sulfur is added at temperatures higher than 140° C., which creates sulfate linkages between SBS polymers and forms a crosslinked polymer network. This crosslinked polymer network is crucial for the necessary mechanical properties, only when the polymer is dispersed evenly (Wen et al., "Improved Properties of SBS-Modified Asphalt with Dynamic Vulcanization," Polym. Eng. Sci. 42:1070-1081 (2002), which is hereby incorporated by reference in its entirety). The addition of 0.2 wt % sulfur and 6.0 wt % SESO represented a drastic reduction in visual particle distribution and average particle size, showing SESO's effectiveness to evenly disperse SBS particles in VTBs. FIG. 7D shows the desired result of rejuvenated polymer modified VTB (RPMVTB).

TABLE 3

Figure 7:
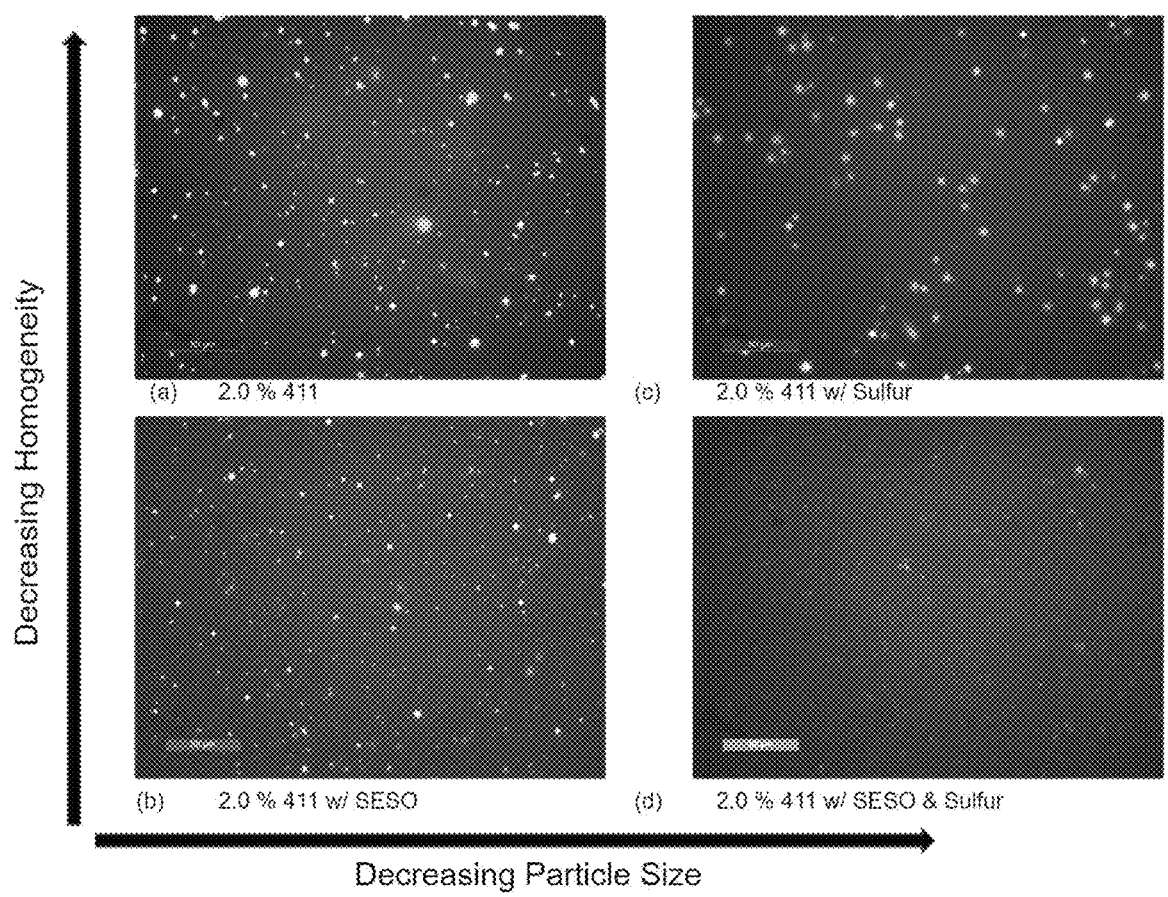
FIGS. 7A-7D show fluorescence microscopy images that illustrate the role of sulfur-activated SESO on the compatibilization of SBS polymer in VTB binder: 2.0 wt % SBS+VTB shows large styrene-rich domains throughout the as-blended specimen (FIG. 7A); 2.0 wt % SBS+6.0 wt % SESO+VTB (FIG. 7B); 2.0 wt % SBS+0.2 wt % Sulfur+VTB (FIG. 7C); 2.0 wt % SBS+0.2 wt % Sulfur+6.0 wt % SESO+VTB (FIG. 7D).

Analytical Analysis Summary of Fluorescence Microscopy Images in FIG. 7 for the Average Particle Characteristics

| Sample Code | # of particles per mm$^2$ | Average particle size (μm$^2$) | Ferret's Diameter (μm) |
| --- | --- | --- | --- |
| 411 | 4215.78 | 3.94 | 2.02 |
| 411 w/ Sulfur | 1539.19 | 10.68 | 3.63 |
| 411 w/ SESO$_{2.5}$ | 10777.7 | 1.62 | 1.23 |
| 411 w/ Sulfur & SESO$_{2.5}$ | 19277.21 | 1.07 | 0.84 |

Figure 8:
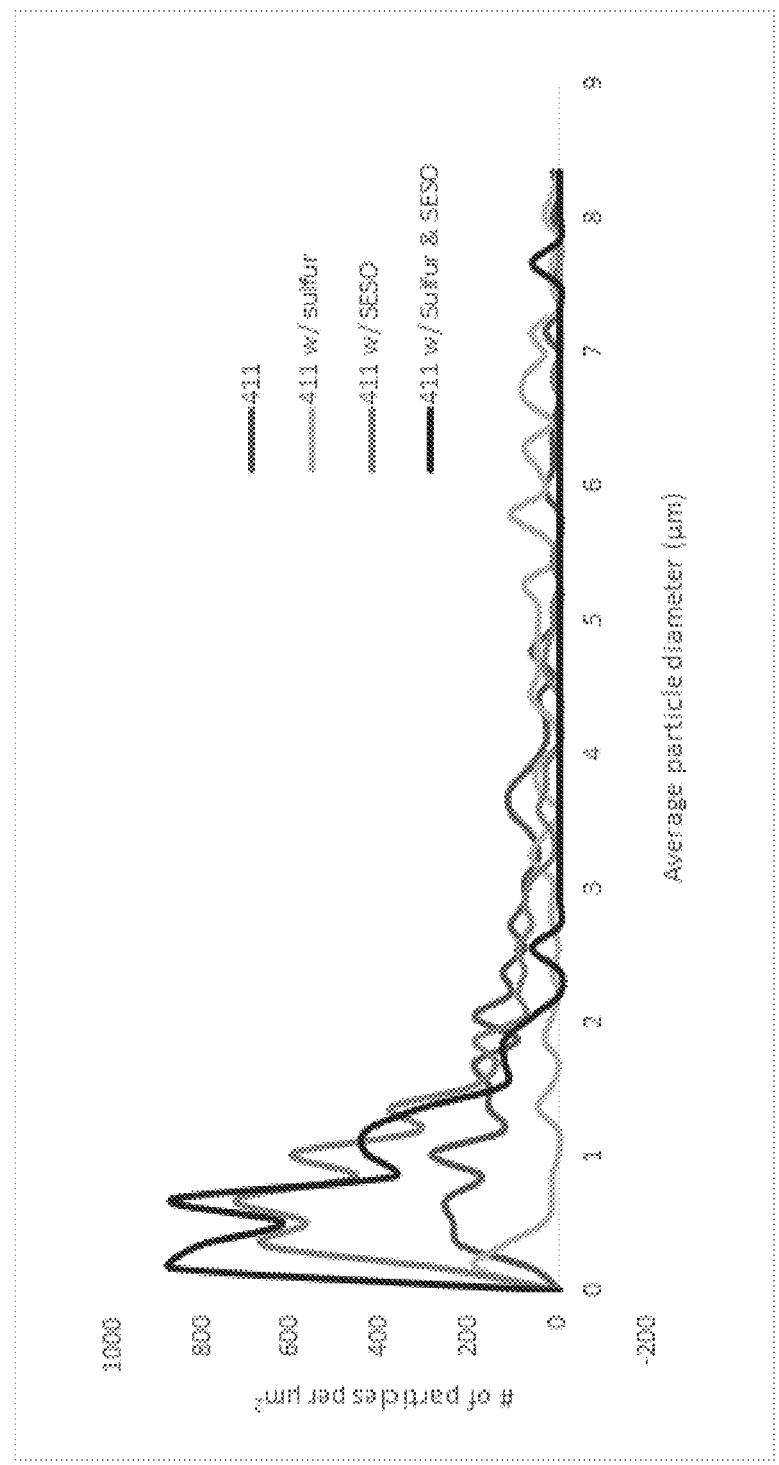
FIG. 8 is a graph plotting the showing size distribution of polymer-rich domains as determined through image analysis of at least four Fluorescence microscopy images per specimen, including the images presented in FIG. 7.

Further particle analysis led to particle size distribution according to volume per area as shown in FIG. 8. The distribution was the analytical analysis of how the same wt. % of radial SBS can produce varying particle size and distribution of particles depending on the additives used. It is important to note that blends that have a large particle diameter will have a reduced number of particles per μm$^2$ due to SBS conglomeration. The results further support that the addition of SESO helped to promote SBS dispersion by lowering the average particle diameter distribution. This dispersion directly related to the polymer morphology in the asphalt needed to achieve optimal mechanical performance.

Binder Rheology

The morphology of RPMVTBs directly links how rejuvenator interactions with asphalt and polymer affect phase compatibility and viscoelastic properties. Rejuvenator interactions with PMA occur by either acting like a cutting agent to reduce low temperature PG or react with SARA components to de-conglomerate asphaltene resin matrices and re-orient SARA components for improving phase compatibility and viscoelastic properties. Distinguishing cutting agents from rejuvenators will help PMVTBs by demonstrating there are substantial differences in viscoelastic, separation, and mass loss performance. RPMVTB performance testing will use continuous grade range, critical high and low temperatures, MSCR, mass loss % and separation testing to determine rejuvenator efficacy.

Test results shown in Table 4 were tested according to previously stated testing methods to quantify the quality of rejuvenation and phase separation. The binder code for each individual sample is detailed in Table 1.

As seen in Table 4, SESO compared to other rejuvenators at lower doses (5.0%) showed a decrease in separation and mass loss %, while slightly increasing the critical performance grade range. This data correlates to the solvency data in FIG. 2 suggesting that SESO has an additional benefit as a rejuvenator. It is important to note that high amounts of EMS (6.0% or greater) have an increased performance improvement on low temperature PG and decreases the % separation but are highly susceptible to mass loss. The mass loss percentage is an indication of material losses during processing between the asphalt terminal and paving, which is important for material processing. This phenomenon could occur because EMS is volatilizing, promoting volatilization of lighter components in VTBs or the ester bond on EMS is breaking down and methanol is being released. The mass loss failure presents a major issue with EMS being used as a rejuvenator. Rearranging the SARA composition by adding hydrolene at 6.0 wt. % can mitigate mass loss failure. This would suggest that mass losses are linked to components within the VTB and not the EMS volatizing, while improving separation.

a direct effect on the polymer structure and the resulting RPMVTB structure. The polymer structure that was developed between rejuvenators and polymers in asphalt will greatly affect the elastic and non-compliance recovery properties to the rejuvenators.

Compiling the data from the fluorescence microscopy, storage stability, and mass loss data with the MSCR performance data provided a more comprehensive picture of which rejuvenators provide the best performance and why. The test method for MSCR was previously stated in the methods section using ASTM D7405-15 and AASHTO T 350-14 standards.

The samples that have rejuvenators in the absences of polymer and sulfur provide a baseline for identifying optimal interactions between binder, rejuvenator, and polymer (Table 5). Neat binder modified with SESO outperformed hydrolene and EMS collectively on elastic recovery perfor-

TABLE 4

Storage Stability and Mass Loss Test Data for Polymer-Modified VTB Formulations with Various Fluxes and Rejuvenators

| Binder code | Critical Temperature PG | Continuous range, C. | Mass loss (%) | Separation 60 C. (%) |
|---|---|---|---|---|
| V | 76-10 (79.9-14.5) | 94.4 | 0.993 | 2.65 |
| VE 5 | 70-22 (72.7-22.65) | 95.3 | 0.780 | 1.40 |
| VE 6 | 64-22 (69.7-24.0) | 93.7 | 0.990 | 1.65 |
| $VS_{2.5}5$ | 70-22 (73.5-22.2) | 95.7 | 0.189 | 0.42 |
| $VS_{1.5}5$ | 70-22 (73.2-22.8) | 96.0 | 0.499 | 1.19 |
| $VH_{600r}5$ | 76-16 (80.6-16.3) | 97.0 | 0.427 | 3.13 |
| VE 10 | 58-28 (59.4-29.9) | 91.54 | 1.842 | 0.28 |
| $VS_{2.5}10$ | 64-28 (64.9-29.8) | 94.7 | 0.360 | 2.15 |
| $VS_{1.5}10$ | 64-28 (64.3-28.0) | 92.64 | 0.284 | 3.52 |
| V P | 82-4 (82.4-8.7) | 91.13 | 1.067 | 1.27 |
| VE 6 P | 76-16 (76.0-20.9) | 96.86 | 1.214 | 0.67 |
| $VS_{4.0}6$ P | 70-16 (75.1-21.4) | 96.5 | 0.861 | 22.77 |
| $VS_{2.5}6$ P | 70-22 (75.9-22.8) | 98.78 | 0.429 | 3.13 |
| $VH_{600r}6$ P | 82-10 (84.3-15.2) | 99.53 | 0.705 | 2.80 |
| V P * | 82-16 (87.7-17.1) | 104.82 | 0.383 | 4.61 |
| VE 6 P * | 70-22 (74.9-23.7) | 98.67 | 1.136 | 6.11 |
| $VS_{4.0}6$ P * | 76-16 (78.0-20.7) | 98.67 | 0.567 | 11.35 |
| $VS_{2.5}6$ P * | 76-22 (81.2-22.8) | 103.53 | 0.427 | 3.12 |
| $VS_{1.5}6$ P * | 76-22 (78.1-22.5) | 100.9 | 0.283 | 2.34 |
| $VH_{600r}6$ P * | 82-16 (85.7-21.1) | 104.41 | 0.567 | 0.93 |
| $VH_{600r}6E$ 6 P * | 70-22 (70.3-25.3) | 95.64 | 0.855 | 4.85 |

V Vacuum Tower Bottom
* 0.2% Sulfur
E Epoxy Methyl Soyate
$S_{4.0}$ 4.0 epoxy mass % of SESO
$S_{2.5}$ 2.5 epoxy mass % of SESO
$S_{1.5}$ 1.5 epoxy mass % of SESO
P 2.0% Radial SBS
$H_{600r}$ Hydrolene 600T Contrary to EMS, the varying oxirane % of SESO (1.5, 2.5, and 4.0%) was crucial in achieving an optimum phase interaction between the polymer and asphalt. Tunable SESO oxirane content allowed optimum interactions with 2.0 wt % radial SBS in the presence of sulfur, reducing mass loss and separation, and increasing the continuous grade range. Evidence for this was shown by the performance of the various SESO contents; 4.0% oxirane content induces phase separation, while 1.5 and 2.5% oxirane reduces phase separation and increase the overall material's performance. Coupling these results with the fluorescence data, oxirane content had mance. The additional interactions of SESO suggested varying oxirane content and structure provides unique characteristics when used to modify a binder. As a radial SBS polymer was introduced to the blends in the absence of sulfur the data showed a consistent story of how oxirane content of SESO affected the elastic recovery and phase separation. Radial 411 SBS polymer with EMS is comparable to SESO (2.5% oxirane content), but the mass loss when using EMS is too high.

TABLE 5

Multiple Stress Creep Recovery Performance Data for Various Polymer-Modified VTB Binders

| Binder code | Critical Temperature PG | Continuous range, C. | Mass loss (%) | Recovery at 58 C. (%) | Jnr 3.2 at 58 C. | Separation 60 C. (%) |
|---|---|---|---|---|---|---|
| V | 76-10 (79.9-14.5) | 94.4 | 0.993 | 17.4 | 0.54 | 2.65 |
| V E 5 | 70-22 (72.7-22.65) | 95.3 | 0.780 | 7.17 | 0.494 | 1.40 |
| V E 6 | 64-22 (69.7-24.0) | 93.7 | 0.990 | 3.24 | | 1.65 |
| V $S_{2.5}$5 | 70-22 (73.5-22.2) | 95.7 | 0.189 | 9.27 | 0.5 | 0.42 |
| V $S_{1.5}$5 | 70-22 (73.2-22.8) | 96.0 | 0.499 | 9.03 | 0.461 | 1.19 |
| V $H_{600t}$5 | 76-16 (80.6-16.3) | 97.0 | 0.427 | 23.6 | 0.123 | 3.13 |
| V E 10 | 58-28 (59.4-29.9) | 91.54 | 1.842 | *-0.350 | 2.979 | 0.28 |
| V $S_{2.5}$10 | 64-28 (64.9-29.8) | 94.7 | 0.360 | 1.22 | 1.786 | 2.15 |
| V $S_{1.5}$10 | 64-28 (64.3-28.0) | 92.64 | 0.284 | 0.57 | 1.904 | 3.52 |
| V P | 82-4 (82.4-8.7) | 91.13 | 1.067 | 28.13 | 0.093 | 1.27 |
| V E 6 P | 76-16 (76.0-20.9) | 96.86 | 1.214 | 15.78 | 0.346 | 0.67 |
| V $S_{4.0}$6 P | 70-16 (75.1-21.4) | 96.5 | 0.861 | 13.21 | 0.364 | 22.77 |
| V $S_{2.5}$6 P | 70-22 (75.9-22.8) | 98.78 | 0.429 | 17.44 | 0.281 | 3.13 |
| V $H_{600t}$6 P | 82-10 (84.3-15.2) | 99.53 | 0.705 | 36.53 | 0.069 | 2.80 |
| V P * | 82-16 (87.7-17.1) | 104.82 | 0.383 | 62.99 | 0.036 | 4.61 |
| V E 6 P * | 70-22 (74.9-23.7) | 98.67 | 1.136 | 47.98 | 0.247 | 6.11 |
| V $S_{4.0}$6 P * | 76-16 (78.0-20.7) | 98.67 | 0.567 | 49.8 | 0.168 | 11.35 |
| V $S_{2.5}$6 P * | 76-22 (81.2-22.8) | 103.53 | 0.427 | 58.03 | 0.108 | 3.12 |
| V $S_{1.5}$6 P * | 76-22 (78.1-22.5) | 100.9 | 0.283 | 54.4 | 0.155 | 2.34 |
| V $H_{600t}$6 P * | 82-16 (85.7-18.7) | 104.41 | 0.567 | 65.5 | 0.045 | 0.93 |
| V $H_{600t}$6E 6 P * | 70-22 (70.3-25.3) | 95.64 | 0.855 | 30.19 | 0.589 | 4.85 |

The addition of sulfur with the Radial SBS increased the homogeneity of the SBS polymer and the performance of the elastic recovery of all the fluxes and rejuvenators. This was supported by SESO (4.0% oxirane content) in the presence of sulfur where the phase separation is decreased by 10.0%. Additionally, this supported the claims made from the fluorescence microscopy in how sulfur vulcanization helped to normalize the particle size deviation. SESO (2.5% oxirane content) provided the highest elastic recovery performance and continuous grade range from the collective group of rejuvenators and fluxes. For EMS to pass mass loss requirement 6.0 wt. % hydrolene 600T was added, resulting in a 20.0% reduction of MSCR performance.

Example 13—Paving in Emily, Minn.

A 58-28S binder from the Cenex Asphalt Terminal in Mandan, N. Dak. was used to produce a pavement section of Minnesota State Highway 6. The PG characteristics of the as-received binder are detailed in Table 6. A SES02.5 modified base binder was produced comprising 6.9 wt % of $SESO_{2.5}$ and 93.1 wt % of the Cenex binder, yielding a PG46-34, which was further mixed with aggregate according to the mix design appearing in Table 7. The SESO modified mix was further mixed with 40 wt % RAP and compacted to 4.0 vol % air voids. A sample of asphalt binder was extracted from the RAP-containing mix for performance grading, which revealed a final grade of PG58-28S.

TABLE 6

Binder Characteristics from a 2019 Demonstration Paving Project Near Emily, MN

| Binder code | $SESO_{2.5}$ (%) | RAP (%) | Critical Temperature PG Range | Continuous Range (° C.) | Mass loss (%) | Δ $T_c$ |
|---|---|---|---|---|---|---|
| Cenex base | — | — | 58-28(60.1-29.6) | 89.7 | 0.17 | 0.0 |
| SESO modified base | 6.9 | — | 46-34(47.9-35.1) | 83 | — | 1.4 |
| Extracted binder | 6.9 | 40.0 | 58-28(60.0-31.2) | 91.2 | — | -0.7 |

TABLE 7

Mix Design for Emily, MN Project

| | Sieve Size | | |
|---|---|---|---|
| | mm | in | wt % |
| Aggregate | 12.5 | (½) | 15 |
| | 9.5 | (⅜) | 20 |
| | 4.75 | (#4) | 10 |
| | 2.36 | (#8) | 11 |
| | 1.18 | (#16) | 15 |
| | 0.600 | (#30) | 16 |
| | 0.300 | (#50) | 7 |
| | 0.15 | (#100) | 2 |
| | 0.075 | (#200) | 3.6 |
| Asphalt Binder | | | 4.9 |
| Air Voids | | | 4 vol % |

To test the produced hot mix asphalt (HMA) for rutting and stripping resistance, the Hamburg wheel tracking (HWT) test was used according to AASHTO T 324-17. In this test, a steel wheel is loaded on the samples and rolled across the specimen repeatedly while submerged in a water bath. In the HWT test the specimens are 150 mm diameter and the thickness must be at least twice the nominal maximum aggregate size. The depth of the rutting is measured as the test progresses and a plot of rut depth in relation to cycles can be created. Two straight slopes will be observed: a linear trend of the rutting occurring with a slope known as the "Creep Slope", followed by an increase after some number of cycles the slope to another linear trend. This abrupt change in slope is the stripping inflection point and indicates the point at which moisture damage has occurred. The test specimens were submerged in water bath at 40° C. After reaching thermal equilibrium, the wheels of HWT device started passing on the specimen surfaces. The test continued until reaching either 20:000 passes or a maximum change in depth of 20 mm was observed in the readings acquired from linear variable displacement transducers (LVDTs). The HWT test was performed based on the guidelines of Iowa Department of Transportation (DOT) as well as according to the AASHTO T 324-17. HWT results appear in Table 8.

TABLE 8

Hamburg Wheel Tracking Test Results for HMA Produced at Emily, MN Project

| SESO wt % | Creep Slope | | Stripping Slope | | SIP[c] | |
|---|---|---|---|---|---|---|
| bnb | μm/pass | SE[a] | μm/pass | SE | Passes | SE |
| 0 | 0.24 | 0.01 | 0.66 | 0.03 | 16031 | 214 |
| 6.9 | 0.51 | 0.06 | 2.84 | 0.35 | 8410 | 657 |

[a]Standard Error
[b]Stripping Inflection Point

Example 14—Paving in Mason City, Iowa

The Pine Bend Flint Hills Resources asphalt terminal of Rosemount, Minn. provided a PG58-28S base binder for a project on county road S62 north of Rock Falls, Iowa. Preliminary binder testing was conducted as summarized in Table 9. RAP was incorporated at rates of 30 wt %, 40 wt %, and 45 wt % (on a final mix design basis) using $SESO_{2.5}$ to maintain low temperature performance grades of −28 or −34.

TABLE 9

Preliminary Binder Testing for Mason City, IA Paving Demonstration
A Flint Hills 58-28S Base Binder Was Used with Various Dosages of $SESO_{2.5}$ and 30 wt %, 40 wt %, or 45 wt % RAP

| $SESO_{2.5}$, wt % | RAP[a] | PG-L ° C. | PG-H ° C. | PG Grade | ΔT$_c$ ° C. | Mass Loss % | R[b] | MSCR 58° C. J$_{nr}$, kPa |
|---|---|---|---|---|---|---|---|---|
| 0.0 | 0 | −29.6 | 60.1 | 58-28 | 0 | 0.17% | | |
| 6.9 | 0 | −35.1 | 47.9 | 46-34 | 1.4 | 0 | | |
| 6.9 | 40 | −31.2 | 60 | 58-28 | −0.7 | 0 | | |
| 0.0 | 0 | −28.8 | 60.1 | 58-28 | 0.4 | 0.17% | 0 | 2.97 |
| 0.0 | 30 | −24.9 | 67.7 | 64-22 | −2.9 | 0.13% | 3.19 | 1.02 |
| 2.8 | 30 | −28.2 | 64.4 | 64-28 | −0.8 | 0.19% | 1.18 | 1.78 |
| 4.7 | 30 | −30.5 | 62.7 | 58-28 | 0.5 | 0.16% | 0.40 | 2.45 |
| 0.0 | 40 | | | | | | | |
| 5.6 | 40 | −29.5 | 62.8 | 58-28 | −0.4 | 0.24% | 0.69 | 2.24 |
| 0.0 | 45 | −25.1 | 69.3 | 64-22 | −2.1 | 0.24% | 4.67 | 0.80 |
| 6.7 | 45 | −30.8 | 63.8 | 58-28 | 0 | 0.16% | 1.41 | 1.83 |
| 11.0 | 45 | −34.2 | 54.5 | 52-34 | 0.7 | 0.33% | 0.00 | 5.7 |

[a]Weight percentage on a basis of the final mix design.
[b]Elastic recovery

Figure 9:
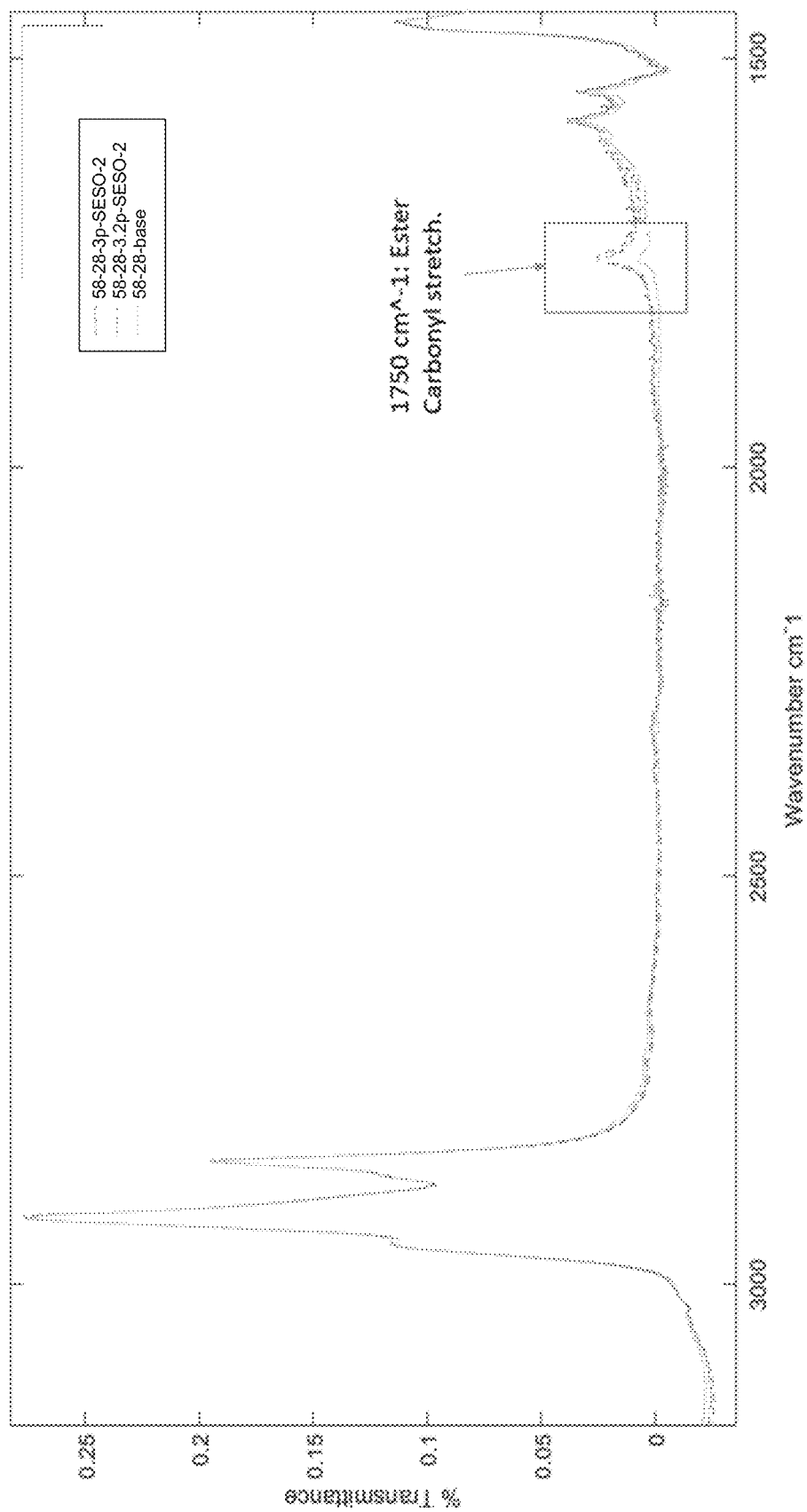
FIG. 9 is a graph showing the comparison between the Fourier-transform infrared spectroscopy (FTIR) spectra of a neat binder (58-28) and two binders (58-28-3p-SESO-2 and 58-28-3.2p-SESO-2) where SESO was added. The spectra of the two specimens show an increase in signal around 1750 cm-1 corresponding to a carbonyl stretch present in triglyceride based molecules.

Fourier Transform Infrared Spectroscopy was used to compare the amount of SESO present in the asphalt samples. See FIG. 9. By analyzing the carbonyl stretch (around 1750 cm$^{-1}$) in the FTIR spectra, it is possible to compare the amount of triglycerides present in different samples.

The preliminary binder testing in Table 9 was used in determining the $SESO_{2.5}$ content for the demonstration project in Mason City, Iowa. Table 10, shows the AC binder (samples were taken before addition to aggregate) performance data used in the Mason City, Iowa demonstration project. A Flint Hills 58-28S base binder with various dosages of $SESO_{2.5}$ was sampled at the hot mix plant before the addition to the aggregate. A Flint hills 53-24S and a lab produced sample of $SESO_{2.5}$ were included for a baseline comparison. Comparing the data to the lab produced sample demonstrates the consistency of $SESO_{2.5}$ performance.

TABLE 10

Binder Testing for Mason City, IA Paving Demonstration

| Binder code | $SESO_{2.5}$ (%) | PG-L ° C. | PG-H ° C. | PG Grade | ΔT$_c$ ° C. | Mass Loss % |
|---|---|---|---|---|---|---|
| 52-34 AC - F | — | −34.1 | 51.2 | 52-34 | 1.4 | 0.18% |
| 58-28 AC - F | — | −29.2 | 58.5 | 58-28 | 0.8 | 0.24% |
| 58-28 AC - F | 3.0 | −30.5 | 54.9 | 52-28 | 2 | 0.17% |
| 58-28 AC - F | 3.0 | −32.2 | 55.1 | 52-28 | 0.7 | 0.18% |
| 58-28 AC - L | 3.0 | −32.5 | 54.1 | 52-28 | 0.4 | 0.23% |

To test the produced hot mix asphalt (HMA) for cracking resistance, the Disk-shaped Compact Tension (DCT) test was used according to ASTM D7313-13. In this test, a steel wheel is loaded on the samples and rolled across the specimen repeatedly while submerged in a water bath. In the DCT test, the specimens are 150 mm in diameter and compacted to a height of 50 mm to obtain an air void content of 7.0%. The DCT specimens were cut to obtain a flattened face and 2 holes so that they could be mounted on the loading fixture of the DCT device. The DCT specimens were set at a temperature of 18.0° C. and experience a displacement rate of 0.017 mm/s. Plotting the load response of the DCT specimen by the displacement rate will provide a curve that is used to calculate the fracture energy of the specimen. The area under the curve is used in the following equation to calculate fracture energy:

$$G_f = \frac{Area}{B*(W-a)}$$

Where $G_f$=Fracture energy (J/m$^2$ (in-lbf/in$^2$))

Area=area under curve

B=specimen thickness (m (in))

(W−a)=specimen thickness (m (in)).

The fracture energy of three HMA were tested demonstrating the performance in high RAP mix designs. DCT results appear in Table 11.

TABLE 11

Dynamic Crack Testing for Mason City, IA Paving Demonstration

| Asphalt Mix code | $SESO_{2.5}$ (%) | RAP (%) | Fracture Energy [J/m$^2$] (−18.0° C.) | CT Index |
|---|---|---|---|---|
| 52-34 AC | — | 34.0 | 480.33 | 104.22 |
| 64-22 AC | 3.0 | 34.0 | 440.33 | 104.02 |
| 64-22 AC | 3.0 | 45.0 | 332.00 | 76.8 |

Example 15—Binder Variability

To assess the dose response of SESO$_{2.5}$ with respect to binder type, six asphalt binders from various sources were treated with 5 wt % SESO$_{2.5}$ and compared. The results appear in Table 12.

TABLE 12

Comparison of Dose Response of SESO$_{2.5}$ in Six Commercially Available Asphalt Binders

| SESO$_{2.5}$, wt % | Source | PG-L ° C. | PG-H ° C. | PG Grade | ΔT$_c$ ° C. | Mass Loss % | R$^b$ | MSCR 58° C. J$_{nr}$, kPa |
|---|---|---|---|---|---|---|---|---|
| 0.0 | 1 | −19.5 | 65.8 | 64-16 | −6.2 | 0.16 | 1.3 | 1.25 |
| 5.0 | 1 | −26.6 | 56.7 | 52-22 | −2.6 | 0.18 | 0.0 | 5.30 |
| 0.0 | 2 | −26.4 | 59.3 | 58-22 | 0.6 | 0.19 | 0.0 | 2.98 |
| 5.0 | 2 | −31.0 | 51.9 | 46-28 | 1.7 | 0.25 | 0.0 | 9.91 |
| 0.0 | 3 | −24.8 | 68.9 | 64-22 | −5.4 | 0.21 | 14.8 | 0.49 |
| 5.0 | 3 | −31.8 | 60.9 | 58-28 | −3.2 | 0.2 | 1.5 | 2.49 |
| 0.0 | 4 | −26.0 | 67.4 | 64-22 | −0.4 | 0.24 | 7.0 | 0.72 |
| 5.0 | 4 | −31.9 | 59.4 | 58-28 | 0.7 | 0.13 | 0.2 | 2.99 |
| 0.0 | 5 | −27.4 | 65.7 | 64-22 | −0.3 | 0.16 | 2.2 | 1.33 |
| 5.0 | 5 | −32.5 | 57.2 | 52-28 | 1.9 | 0.12 | 0.0 | 4.79 |
| 0.0 | 6 | −24.7 | 65.6 | 64-22 | 0.0 | 0.09 | 1.2 | 1.36 |
| 5.0 | 6 | −29.7 | 57.4 | 52-28 | 1.3 | 0.06 | 0.0 | 5.01 |

$^a$Weight percentage on a basis of the final mix design.
$^b$Elastic recovery

Example 16—Utilization of Recycled Asphalt Shingles

Recycled asphalt shingles (RAS) are severely oxidized and present further challenges to significant incorporation in HMA designs. To assess the efficacy of SESO$_{2.5}$ in conjunction with such materials, a 58-28H binder from Bituminous Materials was used in conjunction with RAP and RAS in a binder study. The results appear in Table 13.

TABLE 13

SESO-Enhanced Binder Performance of RAP and RAS in a 58-28H Bituminous Materials

| SESO$_{2.5}$, wt % | RAP$^a$ | RAS$^a$ | PG-L ° C. | PG-H ° C. | PG Grade | R$^b$ | MSCR 58° C. J$_{nr}$, kPa |
|---|---|---|---|---|---|---|---|
| 0.0 | 100 | 0 | −19.4 | 82.4 | 82-16 | | |
| 10.5 | 100 | 0 | −30.4 | 68.4 | 64-28 | | |
| 0.0 | 0 | 100 | −6.1 | 153 | 148-4 | | |
| 0.0 | 0 | 0 | −29.9 | 67.8 | 58-28 | 41.8 | 0.50 |
| 3.5 | 0 | 0 | −34.4 | 62.6 | 58-28 | 14.6 | 0.86 |
| 3.5 | 20 | 6.3 | −29.8 | 69.7 | 64.-2 | 25.0 | 0.65 |

$^a$Weight percentage on a basis of the final mix design.
$^b$Elastic recovery

Example 17—Paving in Indianapolis, Ind.

A parking lot in Indianapolis, Ind. was constructed using a Marathon 64-22S base binder and 45 wt % RAP on a basis of the total mix design. Preliminary binder studies with various SESO$_{2.5}$ dosages were conducted to determine suitable formulations as summarized in Table 14.

TABLE 14

Preliminary Binder Study for Indianapolis, IN Parking Lot Project Using Marathon 64-22 Base Binder with 45 wt % RAP on a Final Mix Design Basis

| SESO$_{2.5}$, wt % | RAP$^a$ | PG-L ° C. | PG-H ° C. | PG Grade | ΔT$_c$ ° C. |
|---|---|---|---|---|---|
| 0.0 | 0 | −25.1 | 65.4 | 64-22 | 0.6 |
| 0.0 | 100 | | 82 | | |
| 4.5 | 0 | −29.7 | 58.9 | 58-28 | 0 |
| 4.5 | 45 | −21.2 | 73.8 | 70-16 | 2.9 |
| 6.5 | 0 | −31.3 | 56.2 | 52-28 | −0.7 |
| 6.5 | 45 | −23 | 71.7 | 70-22 | 2.5 |

$^a$Weight percentage on a basis of the final mix design.

CONCLUSIONS

Rejuvenators are additives primarily used to restore low quality or aged asphalt pavement to that which resembles a virgin binder. This restoration has been linked to changes in SARA composition and/or due to a rearrangement of the resin-asphaltene fractions (Shen et al., "Effects of Rejuvenator on Performance-Based Properties of Rejuvenated Asphalt Binder and Mixtures," *Constr. Build. Mater.* 21:958-964 (2007), which is hereby incorporated by reference in its entirety). Elevated levels of resins and asphaltenes in VTBs, LQA, and RAP materials result in them being highly susceptible to fatigue and cracking. These qualities make RAP, VTBs, and LQA use in Hot mix asphalt (HMA) not desired. This reluctance to use RAP and LQA can be overcome by using a biobased additive that demonstrates molecular diffusion, reconstitution, and visco-elastic properties that further enhance polymer/asphalt structures in HMA and PMA designs (Zaumanis et al., "Influence of Six Rejuvenators on the Performance Properties of Reclaimed Asphalt Pavement (RAP) Binder and 100% Recycled Asphalt Mixtures," *Constr. Build. Mater.* 71:538-550 (2014), which is hereby incorporated by reference in its entirety)

The term 'rejuvenator' has been used for a wide range of products that claim to have increased performance with solvency and critical low temperature grade, without analyzing the interaction of other properties. Rejuvenators can affect properties from the overall continuous grade range to mass loss to the viscoelastic properties. The evidence presented in the application shows how the oxirane content on SESO can affect the performance in VTBs, LQA and RAP mixes. In VTBs the 1.5 and 2.5% oxirane content SESO have superior performance in overall continuous grade and elastic recovery to EMS while eliminating mass loss failure. The fluorescence microscopy of SESO in VTBs shows a drastic reduction of particle size at 400× magnification to where the phase looks completely continuous. In order for EMS to compete with SESO as a rejuvenator an additional flux hydrolene was added to eliminate mass loss failure. Consequently, the overall performance of that blend separates SESO from EMS even further. Results indicated that the biobased additive allowed an increase in the use of RAP in blends by demonstrating asphaltene solvation, showed increased homogeneity, and elastic recovery of blends from VTBs/RAP, and allowed the creation of asphalt fluxes.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. A method of producing an asphalt binder composition comprising:
providing an asphalt binder;
providing a compound of formula (I):

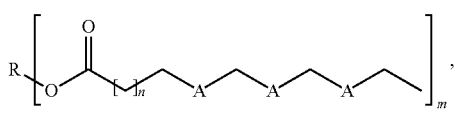

wherein:
each A is selected independently at each occurrence thereof from the group consisting of

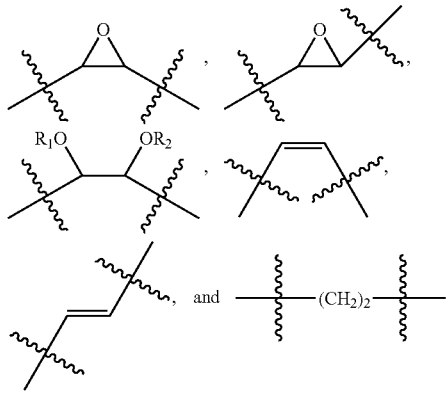

and
wherein at least one A is

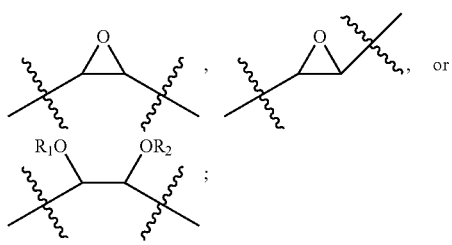

n32 1-12;
m is 1, 2, or 3;
each

represents the point of attachment to a —CH$_2$— group;
R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;
wherein the compound of formula (I) has a mass content of oxirane greater than 0.1 and less than 15%;
providing a compound of formula (II):

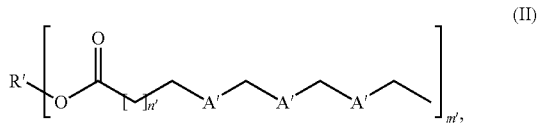

wherein:
each A' is selected independently at each occurrence thereof from the group consisting of

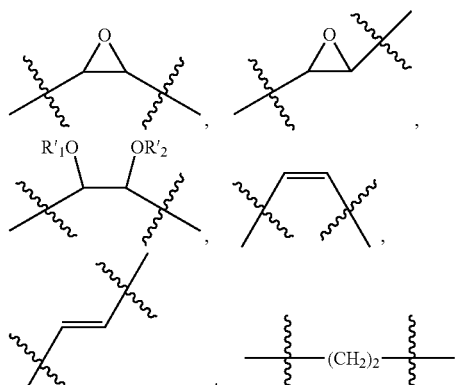

and
wherein at least one A' is n'=1-12;
m' is 1, 2, or 3;
R' is selected from the group consisting of H, C$_1$-C$_{23}$ alkyl, and benzyl, wherein the C$_1$-C$_{23}$ alkyl can be optionally substituted with an aryl, heteroaryl, or heterocyclyl;
R'$_1$ and R'$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;
wherein the compound of formula (II) has a mass content of oxirane greater than 0.1 and less than 5%; the compound of formula (I) is different from the compound of formula (II); and the ratio of the compound of formula (I) to the compound of formula (II) is 1:1000000 to 1000000:1; and
mixing the asphalt binder with the compound of formula (I) and the compound of formula (II) under conditions effective to produce an asphalt binder composition.

2. The method of claim 1, wherein the mass content of oxirane in the compound of formula (I) is between 1.25 and 2.75%.

3. The method of claim 1, wherein the mass content of oxirane in the compound of formula (II) is between 1.25 and 2.75%.

4. The method of claim 1, wherein the compound of formula (I) is selected from the group consisting of epoxidized methyl soyate, epoxidized benzyl soyate, and epoxidized isoamyl soyate.

5. The method of claim 1, wherein the compound of formula (II) is selected from the group consisting of sub-epoxidized soybean oil, sub-epoxidized high oleic soybean oil, and sub-epoxidized corn oil.

6. The method of claim 1, wherein the compound of formula (II) is sub-epoxidized soybean oil and is present in the asphalt binder composition at a mass content of between 0.1 and 10%.

7. The method of claim 1, wherein the compound of formula (II) is sub-epoxidized soybean oil and is present in the asphalt binder composition at a mass content of between 1.5 and 3.9%.

8. The method of claim 1, wherein said mixing comprises:
forming a master batch comprising the compound of formula (I), the compound of formula (II), and the asphalt binder, wherein the compound of formula (I) and the compound of formula (II) are present in the master batch in an amount of 5.0 to 99.0 wt %.

9. The method of claim 1, wherein the asphalt binder is selected from the group consisting of unaged asphalt binder, aged asphalt binder from recycled asphalt pavement, vacuum tower distillation bottom binder, aged asphalt binder from recycled asphalt shingles, de-asphalting bottoms, residuum oil supercritical extraction unit bottoms, and mixtures thereof.

10. The method of claim 1 further comprising:
providing a polymer; and
mixing the asphalt binder composition with the polymer.

11. The method of claim 10, wherein the polymer is SBS or an ethylene vinyl acetate copolymer.

12. The method of claim 11, wherein the polymer is a styrene-butadiene type polymer selected from the group consisting of SB rubber, SBS linear type, SBS radial type, and SB sulphur linked type polymers.

13. The method of claim 1 further comprising:
mixing the asphalt binder composition with a carboxyl additive.

14. The product of the method of claim 1.

15. An asphalt binder composition comprising:
an asphalt binder;
a compound of formula (I):

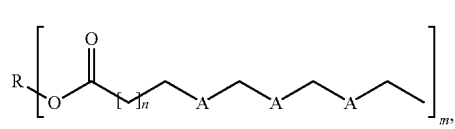
(I)

wherein:
each A is selected independently at each occurrence thereof from the group consisting of

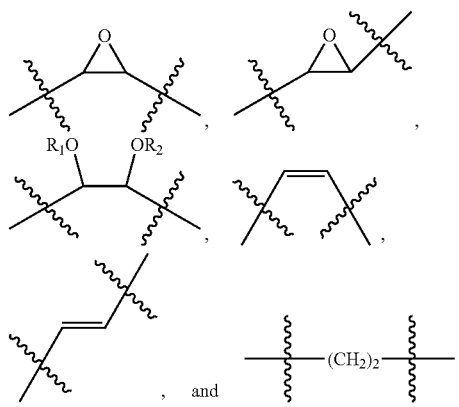

and wherein at least one A is

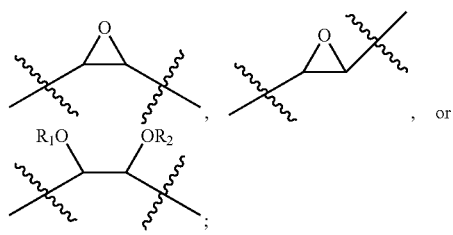

$n = 1-12$;
$m$ is 1, 2, or 3;
each

represents the point of attachment to a —CH$_2$— group;
R is selected from the group consisting of H, C$_1$-C$_{23}$ alkyl, and benzyl, wherein the C$_1$-C$_{23}$ alkyl can be optionally substituted with an aryl, heteroaryl, or heterocyclyl;
R$_1$ and R$_2$ are independently selected from the group consisting of H, C$_1$-C$_{23}$ alkyl and benzyl, wherein the C$_1$-C$_{23}$ alkyl can be optionally substituted with an aryl, heteroaryl, or heterocyclyl;
wherein the compound of formula (I) has a mass content of oxirane greater than 0.1 and less than 15%;
a compound of formula (II):

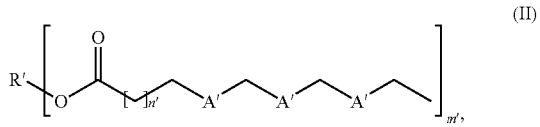
(II)

wherein:
each A' is selected independently at each occurrence thereof from the group consisting of

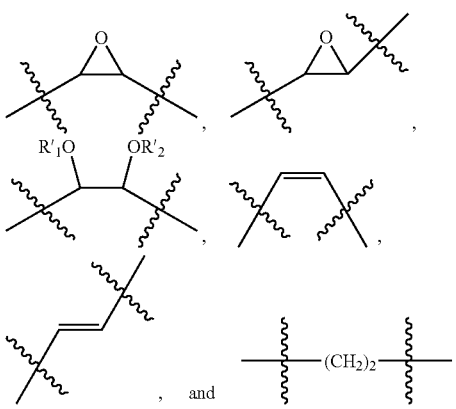

and
wherein at least one A' is

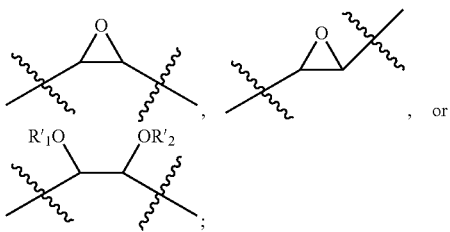

n' 32 1-12;
m' is 1, 2, or 3;
R' is selected from the group consisting of H, $C_1$-$C_{23}$ alkyl, and benzyl, wherein the $C_1$-$C_{23}$ alkyl can be optionally substituted with an aryl, heteroaryl, or heterocyclyl;
$R'_1$ and $R'_2$ are independently selected from the group consisting of H, $C_1$-$C_{23}$ alkyl and benzyl, wherein the $C_1$-$C_{23}$ alkyl can be optionally substituted with an aryl, heteroaryl, or heterocyclyl;
wherein the compound of formula (II) has a mass content of oxirane greater than 0.1 and less than 5%; the compound of formula (I) is different from the compound of formula (II); and the ratio of the compound of formula (I) to the compound of formula (II) is 1:1000000 to 1000000:1.

16. The asphalt binder composition of claim 15, wherein the mass content of oxirane in the compound of formula (I) is between 1.25 and 2.75%.

17. The asphalt binder composition of claim 15, wherein the mass content of oxirane in the compound of formula (II) is between 1.25 and 2.75%.

18. The asphalt binder composition of claim 15 further comprising:
a polymer.

19. The asphalt binder composition of claim 18, wherein the polymer is SBS or an ethylene vinyl acetate copolymer.

20. The asphalt binder composition of claim 19, wherein the styrene-butadiene type polymer is selected from the group consisting of SB rubber, SBS linear type, SBS radial type, and SB sulphur linked type polymers.

21. The asphalt binder composition of claim 15, wherein the compound of formula (I) is selected from the group consisting of epoxidized methyl soyate, epoxidized benzyl soyate, and epoxidized isoamyl soyate.

22. The asphalt binder composition of claim 15, wherein the compound of formula (II) is selected from the group consisting of sub-epoxidized soybean oil, sub-epoxidized high oleic soybean oil, and sub-epoxidized corn oil.

23. The asphalt binder composition of claim 15, wherein the compound of formula (II) is sub-epoxidized soybean oil and is present in the asphalt binder composition at a mass content of between 0.1 and 10%.

24. The asphalt binder composition of claim 15, wherein the compound of formula (II) is sub-epoxidized soybean oil and is present in the asphalt binder composition at a mass content of between 1.5 and 3.9%.

25. An asphalt product composition comprising:
the asphalt binder composition of claim 15, and
a mineral aggregate.

26. The asphalt product composition of claim 25, wherein the mineral aggregate is selected from the group consisting of sand, gravel, limestone, quartzite, granite, crushed stone, recycled asphalt pavement (RAP), recycled asphalt shingles (RAS), and combinations thereof.

27. The asphalt product composition of claim 26, wherein the asphalt product composition is in the form of asphalt concrete.

28. The asphalt product composition of claim 26, wherein the asphalt product composition is in the form of an asphalt mixture.

29. An asphalt product composition comprising:
the asphalt binder composition of claim 15, and
fiberglass and a mineral aggregate.

30. A roofing shingle comprising the asphalt binder composition of claim 15.

31. A recycled asphalt pavement aggregate comprising the asphalt binder composition of claim 15.

32. The asphalt binder composition of claim 15 further comprising:
a carboxyl additive.

33. A method of forming a pavement comprising:
(a) providing the asphalt binder composition of claim 15;
(b) mixing the composition with a mineral aggregate to form a mixture;
(c) applying the mixture to a surface to be paved to form an applied paving material, and
(d) compacting the applied paving material to form the pavement.

* * * * *

UNITED STATES PATENT AND TRADEMARK OFFICE
CERTIFICATE OF CORRECTION

PATENT NO. : 11,773,265 B2
APPLICATION NO. : 17/025625
DATED : October 3, 2023
INVENTOR(S) : Eric W. Cochran et al.

It is certified that error appears in the above-identified patent and that said Letters Patent is hereby corrected as shown below:

In the Claims

At Claim 1, Column 51, Line 52, delete "n32 1-12;" and insert --n = 1-12;-- in its place.

At Claim 15, Column 55, Line 33, delete "n'32 1-12;" and insert --n' = 1-12;-- in its place.

Signed and Sealed this
Seventh Day of November, 2023

Katherine Kelly Vidal
*Director of the United States Patent and Trademark Office*